US012072082B2

(12) United States Patent
Halliwell

(10) Patent No.: US 12,072,082 B2
(45) Date of Patent: Aug. 27, 2024

(54) LIGHTING FIXTURE MOUNTING SYSTEMS

(71) Applicant: Feit Electric Company, Inc., Pico Rivera, CA (US)

(72) Inventor: Brian Halliwell, Pico Rivera, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

(21) Appl. No.: 18/479,265

(22) Filed: Oct. 2, 2023

(65) Prior Publication Data
US 2024/0027056 A1     Jan. 25, 2024

Related U.S. Application Data

(63) Continuation of application No. 18/066,729, filed on Dec. 15, 2022, now Pat. No. 11,808,435, which is a
(Continued)

(51) Int. Cl.
*F21V 21/02*     (2006.01)
*F21S 8/04*      (2006.01)
(Continued)

(52) U.S. Cl.
CPC ................ *F21V 21/02* (2013.01); *F21S 8/04* (2013.01); *F16B 21/09* (2013.01); *F21S 8/033* (2013.01);
(Continued)

(58) Field of Classification Search
CPC ...... F21V 21/02; F21V 23/001; F21V 23/026; F21S 8/04; F21S 8/033; F21Y 2105/10; F21Y 2115/10; F21B 21/09
See application file for complete search history.

(56) References Cited

U.S. PATENT DOCUMENTS

| 2,518,774 A | 8/1950 | Grosser |
| 2,545,124 A | 3/1951 | Tornblom |

(Continued)

FOREIGN PATENT DOCUMENTS

| CN | 202546560 U | 11/2012 |
| EP | 2473002 A2 | 7/2012 |

(Continued)

OTHER PUBLICATIONS

Canadian Intellectual Property Office, Requisition by the Examiner for Application No. 2,971,917, dated Jan. 26, 2018, 5 pages, Canada.
(Continued)

*Primary Examiner* — Tracie Y Green
*Assistant Examiner* — Michael Chiang
(74) *Attorney, Agent, or Firm* — Alston & Bird LLP

(57) ABSTRACT

Example embodiments provide lighting fixture mounting kits for mounting a flat panel lighting fixture to a mounting surface. The lighting fixture mounting kits may comprise a mounting portion (e.g., a mounting plate) and a lighting fixture. The mounting portion may be secured relative to a mounting surface and may comprise mounting catches. The lighting fixture may be secured relative to the mounting portion, and may comprise fixture catches configured to selectably engage the mounting catches. The lighting fixture may be slidable relative to the mounting portion between an engaged configuration in which the fixture catches are engaged with the mounting catches; and a disengaged configuration in which the fixture catches are disengaged from the mounting catches. When in the disengaged configuration, the lighting fixture is pivotable away from the mounting portion to facilitate access to a back portion of the lighting fixture.

13 Claims, 16 Drawing Sheets

Related U.S. Application Data continuation of application No. 17/366,873, filed on Jul. 2, 2021, now Pat. No. 11,555,599, which is a continuation of application No. 16/822,962, filed on Mar. 18, 2020, now Pat. No. 11,085,614, which is a continuation of application No. 15/295,519, filed on Oct. 17, 2016, now Pat. No. 10,634,320, which is a continuation of application No. 15/196,683, filed on Jun. 29, 2016, now Pat. No. 10,047,937.

(51) Int. Cl.
| | |
|---|---|
| *F16B 21/09* | (2006.01) |
| *F21S 8/00* | (2006.01) |
| *F21V 23/00* | (2015.01) |
| *F21V 23/02* | (2006.01) |
| *F21Y 105/10* | (2016.01) |
| *F21Y 115/10* | (2016.01) |

(52) U.S. Cl.
CPC ........... *F21V 23/001* (2013.01); *F21V 23/026* (2013.01); *F21Y 2105/10* (2016.08); *F21Y 2115/10* (2016.08)

(56) References Cited

U.S. PATENT DOCUMENTS

| | | | |
|---|---|---|---|
| 3,506,232 | A | 4/1970 | Wolar et al. |
| 3,780,973 | A | 12/1973 | Dalton |
| 4,426,126 | A | 1/1984 | De et al. |
| 5,056,954 | A | 10/1991 | Flux et al. |
| 5,560,101 | A | 10/1996 | Sandell et al. |
| 5,806,972 | A | 9/1998 | Kaiser et al. |
| 6,296,372 | B1 | 10/2001 | Rhomberg |
| 6,328,461 | B1 | 12/2001 | Younker |
| 6,517,216 | B1* | 2/2003 | Cercone ................. F21S 8/026 362/371 |
| 6,653,558 | B1 | 11/2003 | Bucher et al. |
| 6,769,785 | B1 | 8/2004 | Herst et al. |
| 6,880,963 | B2 | 4/2005 | Luig et al. |
| 6,991,352 | B2 | 1/2006 | Garber et al. |
| 7,111,957 | B2 | 9/2006 | Bernhart et al. |
| 7,213,938 | B2 | 5/2007 | Brondt et al. |
| 7,547,112 | B2 | 6/2009 | Kim |
| 7,631,994 | B2 | 12/2009 | Halliwell et al. |
| 7,866,850 | B2 | 1/2011 | Alexander et al. |
| 8,047,673 | B2 | 11/2011 | Santoro |
| 8,152,336 | B2 | 4/2012 | Alexander et al. |
| 8,297,579 | B1 | 10/2012 | Gretz |
| 8,376,592 | B2 | 2/2013 | Engstrom et al. |
| 8,382,341 | B2 | 2/2013 | Peter |
| 8,485,700 | B2 | 7/2013 | Ngai |
| 8,613,529 | B2 | 12/2013 | Watanabe et al. |
| 8,622,590 | B2 | 1/2014 | Cheng |
| 8,714,775 | B2 | 5/2014 | Bracher et al. |
| 8,915,636 | B2 | 12/2014 | Araki et al. |
| 8,950,921 | B2 | 2/2015 | Sheng |
| 9,133,981 | B2 | 9/2015 | Lenherr |
| 9,188,290 | B2 | 11/2015 | Lay et al. |
| 9,194,561 | B2 | 11/2015 | Wu et al. |
| 9,228,724 | B2 | 1/2016 | Wu |
| 9,285,081 | B2 | 3/2016 | Douglas et al. |
| 9,447,949 | B2 | 9/2016 | Rashidi Doust |
| 9,453,616 | B2 | 9/2016 | Myers et al. |
| 9,702,533 | B1 | 7/2017 | Harpenau et al. |
| 9,714,760 | B2 | 7/2017 | Scoggin |
| 9,835,300 | B2 | 12/2017 | Feit et al. |
| 9,897,305 | B2 | 2/2018 | Ryder et al. |
| 9,927,103 | B2 | 3/2018 | Feit et al. |
| 10,047,937 | B2 | 8/2018 | Halliwell |
| 10,234,115 | B2 | 3/2019 | Halliwell |
| 10,429,044 | B2 | 10/2019 | Halliwell |
| 10,465,871 | B2 | 11/2019 | Feit et al. |
| 10,473,306 | B2 | 11/2019 | Feit et al. |
| 10,634,320 | B2 | 4/2020 | Halliwell |
| 10,845,015 | B2 | 11/2020 | Brothwell |
| 10,859,244 | B2 | 12/2020 | Halliwell |
| 10,895,368 | B2 | 1/2021 | Feit et al. |
| 10,969,070 | B2 | 4/2021 | Feit et al. |
| 11,085,614 | B2 | 8/2021 | Halliwell |
| 11,248,776 | B2 | 2/2022 | Feit et al. |
| 11,255,522 | B2 | 2/2022 | Halliwell |
| 11,339,935 | B2 | 5/2022 | Feit et al. |
| 11,555,599 | B2 | 1/2023 | Halliwell |
| 2003/0060067 | A1 | 3/2003 | Kerr |
| 2003/0082948 | A1 | 5/2003 | Hakkarainen et al. |
| 2003/0147749 | A1 | 8/2003 | Kerr |
| 2006/0108137 | A1 | 5/2006 | Smith |
| 2009/0237958 | A1 | 9/2009 | Kim |
| 2010/0208473 | A1 | 8/2010 | Sakai et al. |
| 2010/0220497 | A1 | 9/2010 | Ngai |
| 2011/0185609 | A1 | 8/2011 | Miedema et al. |
| 2012/0106177 | A1 | 5/2012 | Blankestijn et al. |
| 2012/0266449 | A1 | 10/2012 | Krupa |
| 2013/0016504 | A1 | 1/2013 | Garber |
| 2013/0044512 | A1 | 2/2013 | Araki et al. |
| 2013/0286667 | A1 | 10/2013 | Sampsell et al. |
| 2013/0292149 | A1 | 11/2013 | Cooper et al. |
| 2013/0307420 | A1 | 11/2013 | Yoder et al. |
| 2014/0063776 | A1 | 3/2014 | Clark et al. |
| 2014/0071687 | A1 | 3/2014 | Tickner et al. |
| 2014/0092608 | A1 | 4/2014 | Moser et al. |
| 2014/0160772 | A1 | 6/2014 | Wu |
| 2014/0268766 | A1 | 9/2014 | Lu |
| 2014/0268825 | A1 | 9/2014 | Lay et al. |
| 2014/0313775 | A1 | 10/2014 | Myers et al. |
| 2015/0009666 | A1 | 1/2015 | Keng et al. |
| 2015/0016105 | A1 | 1/2015 | Lin et al. |
| 2015/0085499 | A1 | 3/2015 | Mandy et al. |
| 2015/0153031 | A1 | 6/2015 | Myers et al. |
| 2015/0167903 | A1 | 6/2015 | Yao |
| 2015/0267873 | A1 | 9/2015 | Price et al. |
| 2015/0309248 | A1 | 10/2015 | Xu |
| 2015/0316241 | A1* | 11/2015 | Kaplan ................. F21S 8/04 362/147 |
| 2015/0338038 | A1 | 11/2015 | Feit et al. |
| 2015/0338071 | A1 | 11/2015 | Feit et al. |
| 2016/0033098 | A1 | 2/2016 | Bergman et al. |
| 2016/0131346 | A1 | 5/2016 | Creasman et al. |
| 2017/0009962 | A1 | 1/2017 | Feit et al. |
| 2018/0003366 | A1 | 1/2018 | Halliwell |
| 2018/0003367 | A1 | 1/2018 | Halliwell |
| 2019/0368701 | A1 | 12/2019 | Halliwell |
| 2021/0332971 | A1 | 10/2021 | Halliwell |
| 2022/0136684 | A1 | 5/2022 | Feit et al. |
| 2022/0136685 | A1 | 5/2022 | Halliwell |
| 2022/0252230 | A1 | 8/2022 | Feit et al. |
| 2023/0119998 | A1 | 4/2023 | Halliwell |

FOREIGN PATENT DOCUMENTS

| | | |
|---|---|---|
| KR | 10-1398387 B1 | 5/2014 |
| WO | 2006/037572 A1 | 4/2006 |

OTHER PUBLICATIONS

Canadian Intellectual Property Office, Requisition by the Examiner for Application No. 2,979,140, dated Mar. 22, 2018, 5 pages, Canada.

Canadian Intellectual Property Office, Requisition by the Examiner for Application No. 2,979,652, dated Jun. 26, 2018, 4 pages, Canada.

NonFinal Office Action for U.S. Appl. No. 15/800,409, dated Mar. 8, 2019, (26 pages), United States Patent and Trademark Office, US.

NonFinal Office Action for U.S. Appl. No. 16/036,470, dated Oct. 4, 2018, (5 pages), United States Patent and Trademark Office, US.

NonFinal Office Action for U.S. Appl. No. 16/262,287, dated May 24, 2019, (7 pages), United States Patent and Trademark Office, US.

NonFinal Office Action for U.S. Appl. No. 16/551,194, dated Apr. 16, 2020, (12 pages), United States Patent and Trademark Office, US.

(56) References Cited

OTHER PUBLICATIONS

NonFinal Office Action for U.S. Appl. No. 16/573,140, dated Aug. 12, 2020, (10 pages), United States Patent and Trademark Office, US.

NonFinal Office Action for U.S. Appl. No. 17/660,867, dated Dec. 21, 2022, (16 pages), United States Patent and Trademark Office, US.

Notice of Allowance for U.S. Appl. No. 16/262,287, dated Jun. 13, 2019, (7 pages), United States Patent and Trademark Office, US.

Notice of Allowance for U.S. Appl. No. 16/573,140, dated Dec. 30, 2020, (8 pages), United States Patent and Trademark Office, US.

OKTLighting, www.youtube.com/watch?v=xrtp1RTxsEQ, Jan. 21, 2016, timestamp 0:00, 0:14, 0:21-22, 0:27-31, 0:48-1:06.

United State Patent and Trademark Office, Office Action for U.S. Appl. No. 15/196,683, dated Jan. 16, 2018, 12 pages, U.S.A.

United States Patent and Trademark Office, Non-Final Office Action for U.S. Appl. No. 17/573,204, filed Dec. 19, 2022, 26 pages, U.S.A.

United States Patent and Trademark Office, Non-Final Office Action for U.S. Appl. No. 17/573,204, filed Jun. 13, 2023, 25 pages, U.S.A.

United States Patent and Trademark Office, Non-Final Office Action for U.S. Appl. No. 17/660,867, filed Dec. 21, 2022, 24 pages, U.S.A.

United States Patent and Trademark Office, Corrected Notice of Allowability for U.S. Appl. No. 15/272,645, filed Feb. 23, 2018, (3 pages), U.S.A.

United States Patent and Trademark Office, Notice of Allowance for U.S. Appl. No. 15/196,683, filed May 2, 2018, 8 pages, U.S.A.

United States Patent and Trademark Office, Notice of Allowance for U.S. Appl. No. 14/720,255, dated Aug. 3, 2016, 14 pages, U.S.A.

United States Patent and Trademark Office, Notice of Allowance for U.S. Appl. No. 15/272,645, dated Nov. 16, 2017, 14 pages, U.S.A.

United States Patent and Trademark Office, Notice of Allowance received for U.S. Appl. No. 16/822,962, filed Apr. 28, 2021, 20 pages, U.S.

United States Patent and Trademark Office, Office Action for U.S. Appl. No. 14/720,255, filed Nov. 1, 2016, 20 pages, U.S.A.

United States Patent and Trademark Office, Office Action for U.S. Appl. No. 14/720,255, dated Apr. 26, 2017, 16 pages, U.S.A.

United States Patent and Trademark Office, Office Action for U.S. Appl. No. 15/295,519, dated Aug. 24, 2018, 13 pages, U.S.A.

United States Patent and Trademark Office, Office Action for U.S. Appl. No. 15/295,519, filed Oct. 31, 2019, (15 pages), U.S.A.

United States Patent and Trademark Office, Office Action for U.S. Appl. No. 15/898,711, filed Jul. 22, 2019, (14 pages), U.S.A.

U.S. Appl. No. 18/066,729, filed Dec. 15, 2022, 2023/0119998, Allowed.

U.S. Appl. No. 17/366,873, filed Jul. 2, 2021, U.S. Pat. No. 11,555,599, Issued.

U.S. Appl. No. 16/822,962, filed Mar. 18, 2020, U.S. Pat. No. 11,085,614, Issued.

U.S. Appl. No. 15/295,519, filed Oct. 17, 2016, U.S. Pat. No. 10,634,320, Issued.

U.S. Appl. No. 15/196,683, filed Jun. 29, 2016, U.S. Pat. No. 10,047,937, Issued.

\* cited by examiner

FIG. 4
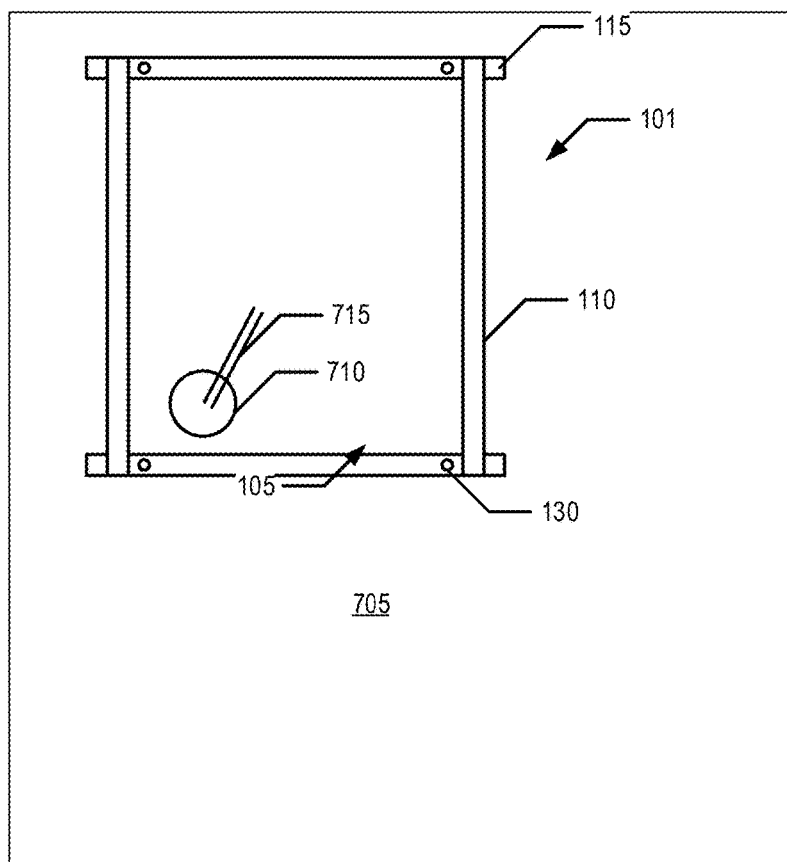
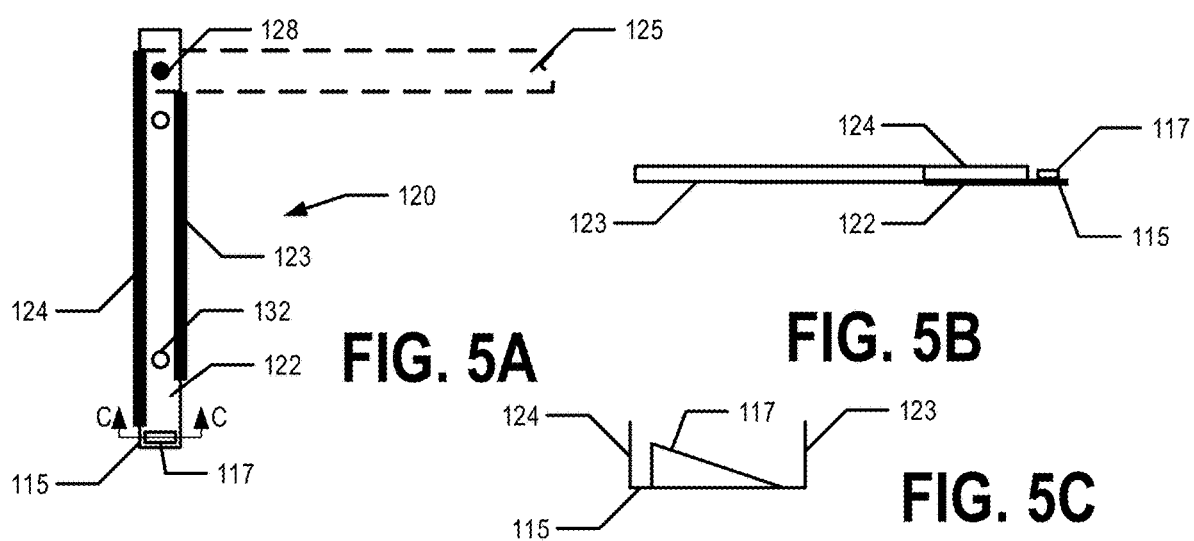
FIG. 5A  FIG. 5B
FIG. 5C

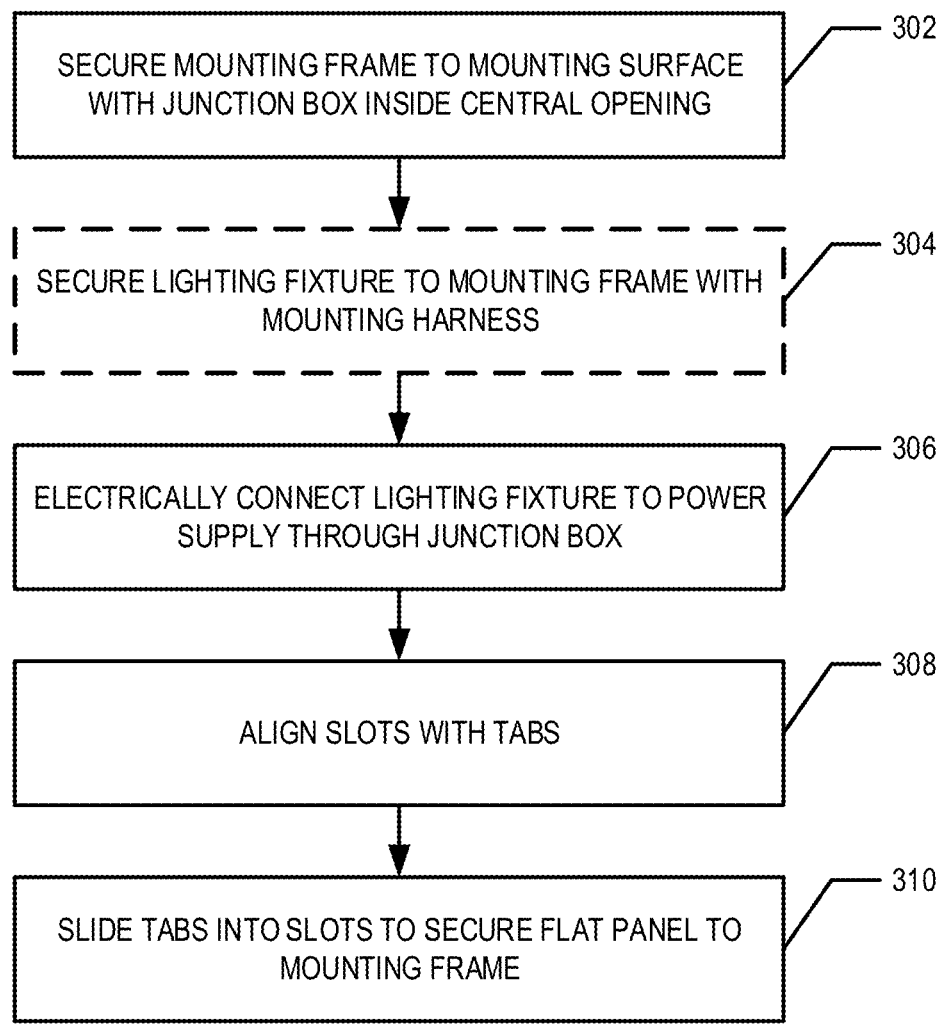

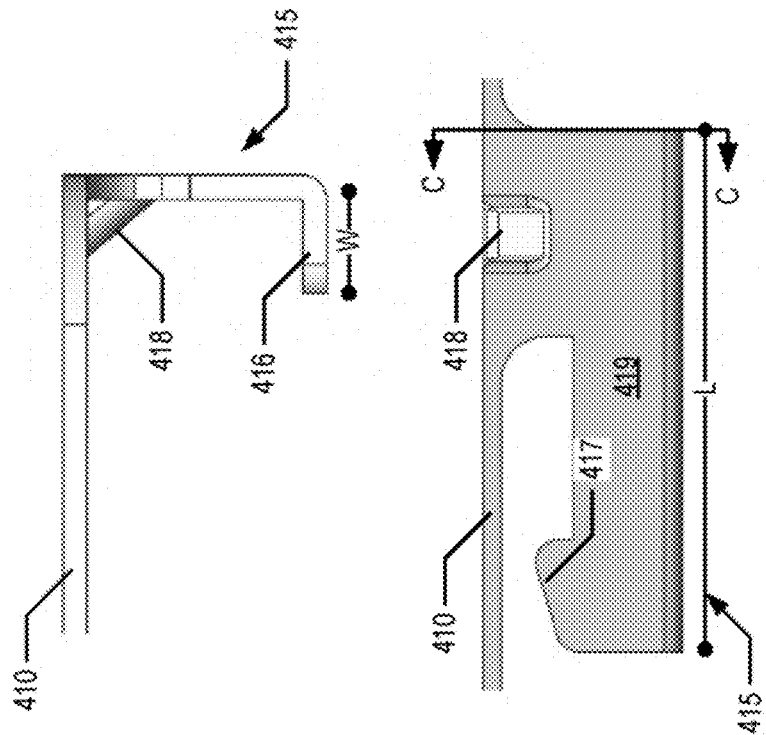
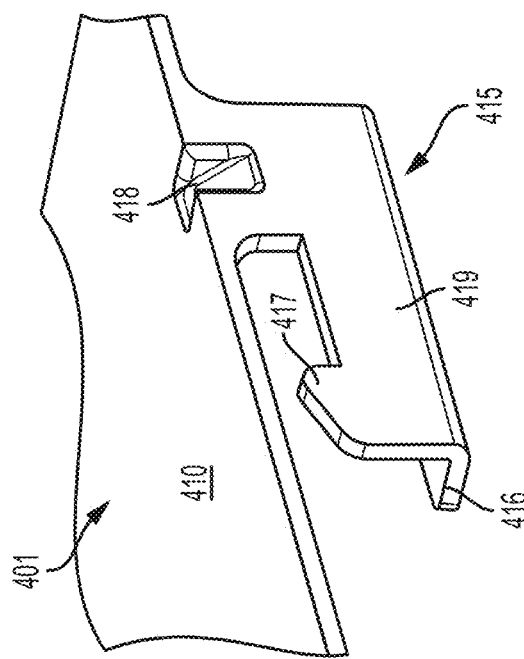
FIG. 11C
FIG. 11B
FIG. 11A

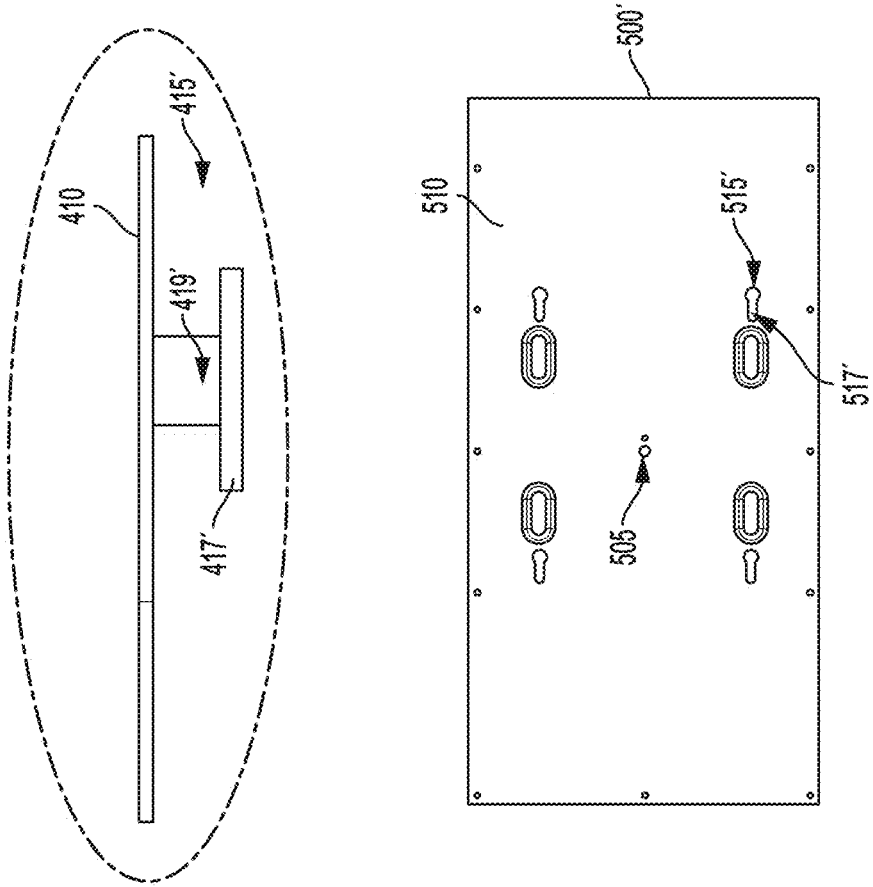
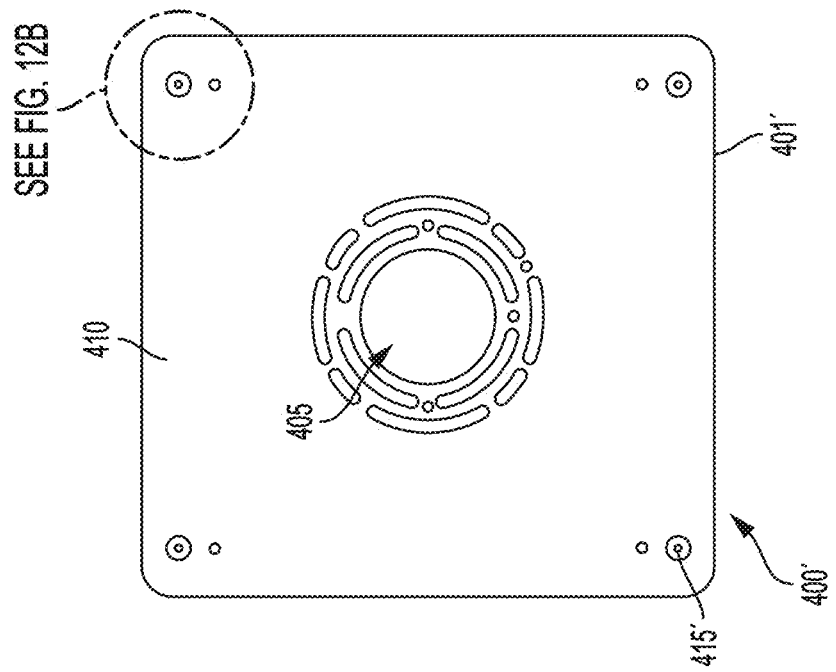
FIG. 12B
FIG. 12C
FIG. 12A

LIGHTING FIXTURE MOUNTING SYSTEMS

CROSS-REFERENCE TO RELATED APPLICATIONS

This patent application is a continuation of U.S. patent application Ser. No. 18/066,729, filed Dec. 15, 2022, which application is further a continuation of U.S. patent application Ser. No. 17/366,873, filed Jul. 2, 2021, which application is further a continuation of U.S. patent application Ser. No. 16/822,962, filed Mar. 18, 2020 and now U.S. Pat. No. 11,085,614, which application is further a continuation of U.S. patent application Ser. No. 15/295,519, filed Oct. 17, 2016 and now granted as U.S. Pat. No. 10,634,320, which application is further a continuation-in-part of U.S. patent application Ser. No. 15/196,683, filed Jun. 29, 2016 and granted as U.S. Pat. No. 10,047,937 on Aug. 14, 2018; the contents of all of which as are incorporated herein by reference herein in their entireties.

BACKGROUND OF THE INVENTION

Flat panel lighting fixtures are a convenient lighting option as they can be mounted to a mounting surface and a relatively low profile compared to other lighting fixtures. Light emitting diode (LED) flat panel lighting fixtures, in particular, generally cannot be mounted through traditional lighting fixture methods. For example, generally the lens of LED flat panel lighting fixtures is secured to the fixture. Thus, an LED flat panel lighting fixture cannot be secured to a mounting surface through by a fastener passing through the back of the lighting fixture.

Therefore, there is a need for new and improved methods and mounting systems for easily and securely mounting an LED flat panel lighting fixture to a mounting surface.

SUMMARY

Embodiments of the present invention provide new and improved methods and mounting systems for mounting an LED flat panel lighting fixture to a mounting surface. Furthermore, the methods and mounted systems described herein may be used to mount a variety of lighting fixtures in addition to LED flat panel lighting fixtures.

According to one aspect of the present invention, a mounting system for mounting a lighting fixture is provided. In an example embodiment, the mounting system comprises a mounting frame comprising a frame portion configured to be secured to a mounting surface; a central opening defined by the frame portion; and one or more tabs disposed on the frame portion and each configured to be inserted into a corresponding slot of the lighting fixture. When the frame portion is secured to the mounting surface a junction box is accessible through the central opening.

In example embodiments, the mounting system further comprises a lighting fixture. The lighting fixture comprises a fixture frame disposed about a perimeter of a back portion of the lighting fixture. The fixture frame comprises one or more slots; and one or more support rail. Each of the one or more slots provides through a portion of one of the one or more support rails. In example embodiments, the lighting fixture is generally rectangular. In example embodiments, each of the one or more slots is configured to receive one of the one or more tabs therein such that the tab may slide into a tab recess defined at least in part by one of the one or more support rails. In example embodiments, the tab recess is further defined at least in part by the fixture frame, the back portion of the lighting fixture, or both. In example embodiments, either (a) a defining surface of the tab recess is shaped, (b) a wedge defined on the tab is shaped, or (c) both such that as the tab is slide into the tab recess, a space between the mounting surface and the back portion of the lighting fixture is reduced. In an example embodiment, one or more tabs are configured to engage the one or more support rails so as to secure the lighting fixture to the mounting surface. In an example embodiment, the mounting frame further comprises one or more frame cables and the lighting fixture further comprises one or more fixture cables and wherein a frame cable is configured to be secured to a corresponding fixture cable.

In an example embodiment, the mounting frame comprises a pair of first frame portions and a pair of second frame portions. The pair of first frame portions comprises two elongated first frame portions that are generally parallel with one another. The pair of second frame portions comprises two elongated second frame portions that are generally parallel with one another. The pair of first frame portions and the pair of second frame portions are secured to each other such that each first frame portion is secured to one of the second frame portions at one end and the other of the second frame portions at an opposite end to form a quadrilateral. Additionally, the central opening is defined as an interior of the quadrilateral. In example embodiments, each of the second frame portions comprises a tab portion on each end of the elongated second frame portion; and the tab portions extend outwardly from an exterior perimeter of the quadrilateral.

In example embodiments, when the mounting frame is secured to a mounting surface, the mounting frame need not be centered about the junction box. In an example embodiment, the mounting frame is configured to be secured to a mounting surface by one or more mechanical fasteners.

According to another aspect of the present invention, a lighting fixture mounting kit for mounting a flat panel lighting fixture to a mounting surface is provided. In an example embodiment, the lighting fixture mounting kit comprises a mounting frame and a lighting fixture. The mounting frame comprises a frame portion configured to be secured to a mounting surface; and a central opening defined by the frame portion. When the frame portion is secured to the mounting surface, a junction box is accessible through the central opening. The mounting frame is shaped for engagement and attachment with a lighting fixture. The lighting fixture comprises a fixture frame disposed about a perimeter of a back portion of the lighting fixture. The fixture frame is shaped for engagement and attachment with the mounting frame.

In example embodiments, the lighting fixture mounting kit further comprises a mounting harness. In an example embodiment, the mounting harness comprises one or more fixture cables; and one or more frame cables. At least one of said one or more fixture cables is configured to be secured to a corresponding one of the one or more frame cables.

According to still another aspect of the present invention, a mounting system for mounting a lighting fixture is provided. In an example embodiment, the mounting system comprises a mounting plate. The mounting plate may comprise a plate portion configured to be secured to a mounting surface; one or more mounting tabs disposed on the plate portion and configured to secure the lighting fixture to the mounting plate and extending outwardly from a plane defined by the plate portion; and one or more indexing tabs configured to be aligned with corresponding one or more indexing slots of the lighting fixture and extending outwardly from the plane defined by the plate portion.

In example embodiments, the mounting system further comprises a lighting fixture. The lighting fixture may comprise a back portion having therein one or more mounting slots and one or more indexing slots, wherein each mounting slot is configured to receive a mounting tab therein and each indexing slot is configured to receive an indexing tab therein such that insertion of the indexing tab into the indexing slot guides the alignment of at least one of the one or more mounting tabs to the corresponding one of the one or more mounting slots. In example embodiments, one side of the lighting fixture is secured to the mounting plate by a hinge. In example embodiments, the hinge allows the lighting fixture to (a) rotate with respect to the mounting plate at least partially about an axis defined by the hinge and (b) translate, with respect to the mounting plate, along at least a portion of the axis. In example embodiments, at least one of the one or more mounting tabs comprises a locking portion. In example embodiments the back portion of the lighting fixture further comprises at least one locking slot corresponding to a mounting slot. The locking slot is configured to receive the locking portion of the corresponding mounting tab such that the mounting tab is fixedly secured within the corresponding mounting slot. In example embodiments, the one or more indexing tabs are not configured to suspend the lighting fixture therefrom.

In example embodiments, the one or more indexing tabs extend outward from the mounting plate farther than the one or more mounting tabs. In example embodiments, at least one of the one or more mounting tabs is reinforced by (a) an angle reinforcement configured to maintain the angle between the mounting tab and the plate portion, (b) an elongated reinforcement configured to reduce bending of the mounting tab along an elongated portion of the mounting tab, or both.

According to yet another aspect of the present invention, a lighting fixture mounting kit for mounting a flat panel lighting fixture to a mounting surface is provided. In an example embodiment, the lighting fixture mounting kit comprises a mounting plate and a lighting fixture. The mounting plate comprises a plate portion configured to be secured to a mounting surface; and one or more indexing tabs configured to be aligned with corresponding one or more indexing slots of the lighting fixture and extending outwardly from the plane defined by the plate portion. The mounting plate is shaped for engagement and attachment with the lighting fixture. The lighting fixture comprises a back portion having therein the one or more indexing slots. The back portion is shaped for engagement and attachment with the mounting plate. Each indexing slot is configured to receive an indexing tab therein such that insertion of the indexing tab into the indexing slot guides the engagement of the lighting fixture with the mounting plate.

In an example embodiment, the lighting fixture mounting kit further comprises a hinge configured to connect one side of the mounting plate to one side of the lighting fixture. In an example embodiment, the hinge comprises one or more hinge mounting tabs, one or more hinge indexing tabs, or both.

Various embodiments are directed to a mounting system for mounting a lighting fixture. In certain embodiments, the mounting system comprises a mounting portion configured to be secured relative to a mounting surface, wherein the mounting portion comprises one or more mounting catches; and a lighting fixture secured relative to the mounting portion, wherein the lighting fixture comprises one or more fixture catches configured to selectably engage the one or more mounting catches. In various embodiments, the lighting fixture is slidable relative to the mounting portion between: an engaged configuration in which the one or more fixture catches are engaged with the one or more mounting catches; and a disengaged configuration in which the one or more fixture catches are disengaged from the one or more mounting catches. In certain embodiments, the lighting fixture is pivotable relative to the mounting portion when in the disengaged configuration.

Moreover, in certain embodiments, the lighting fixture is pivotable about a first axis relative to the mounting portion when in the disengaged configuration; and the lighting fixture is may be slidable relative to the mounting portion in a direction perpendicular to the first axis. In certain embodiments, the lighting fixture is slidable relative to the mounting portion in a direction substantially parallel to the mounting surface. Moreover, the lighting fixture may be secured relative to the mounting portion by at least one mounting arm, wherein the mounting portion is pivotably secured at a first end of the at least one mounting arm and the lighting fixture is pivotably secured at a second end of the at least one mounting arm. Moreover, the mounting portion may be slidably secured at the first end of the at least one mounting arm. Moreover, the lighting fixture may be secured relative to the mounting portion by at least one mounting harness.

In various embodiments, the lighting fixture is detachably secured relative to the mounting portion. Moreover, in certain embodiments, the mounting portion is configured to be secured to at least one of a junction box secured within the support surface or a can light secured within the support surface. In various embodiments, the one or more mounting catches are configured to bias the lighting fixture toward the support surface when in the engaged configuration. In certain embodiments, the one or more mounting catches comprise one or more locking features configured to bias the lighting fixture into the engaged configuration. Moreover, in certain embodiments, the mounting portion defines at least one guide rail, and wherein the lighting fixture is slidable along the guide rail relative to the mounting portion. In various embodiments, the mounting portion may be one of a mounting plate or a mounting frame. In certain embodiments, the lighting fixture is generally rectangular.

Moreover, various embodiments are directed to a method for mounting a lighting fixture relative to a support surface. In certain embodiments, the method comprises steps for: (i) securing a mounting portion relative to a support surface, wherein the mounting portion comprises one or more mounting catches; (ii) pivoting a lighting fixture secured relative to the mounting portion from a first position to a second position at least substantially parallel to the support surface; and (iii) sliding the lighting fixture relative to the mounting portion from the second position to a third position in which the one or more fixture eyes are engaged with the one or more mounting catches. Moreover, various embodiments comprise steps for electrically connecting the lighting fixture with a power source.

In various embodiments, pivoting the lighting fixture relative to the mounting portion comprises pivoting the lighting fixture about a first axis and sliding the lighting fixture relative to the mounting portion comprises sliding the lighting fixture in a direction at least substantially perpendicular to the first axis. In certain embodiments, the method additionally comprises steps for securing the lighting fixture relative to the mounting portion. Moreover, in certain embodiments, the lighting fixture is pivotably secured to at least one mounting arm. In such embodiments securing the lighting fixture relative to the mounting portion may comprise steps for securing the at least one mounting arm to the mounting portion. Moreover, in various embodiments, securing the mounting portion relative to the support surface comprises one of: securing the mounting portion to a junction box secured within the support surface or securing the mounting portion to a can light secured within the support surface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is a view of a mounting frame secured to a mounting surface, in accordance with an embodiment of the present invention;

Figure 6A:
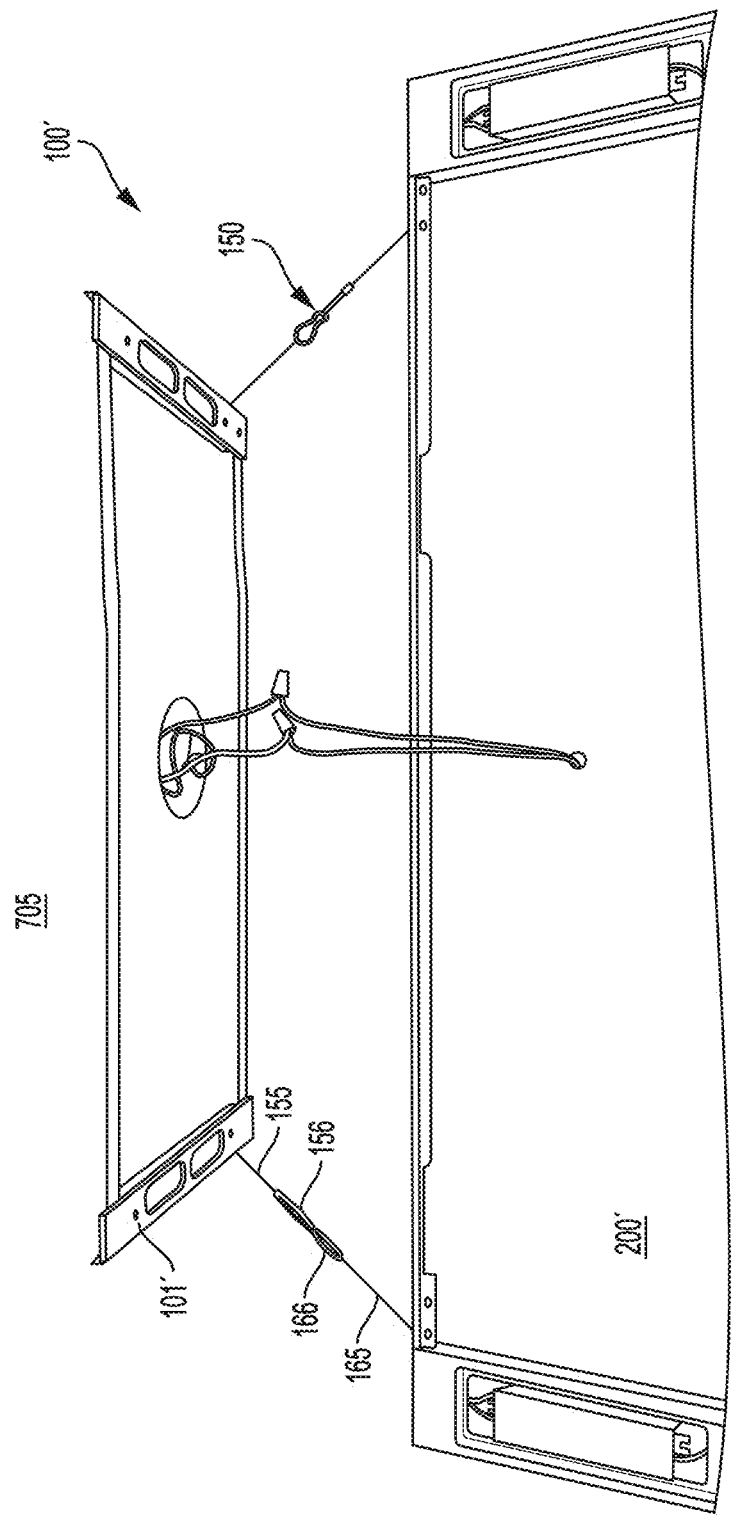
Figure 6B:
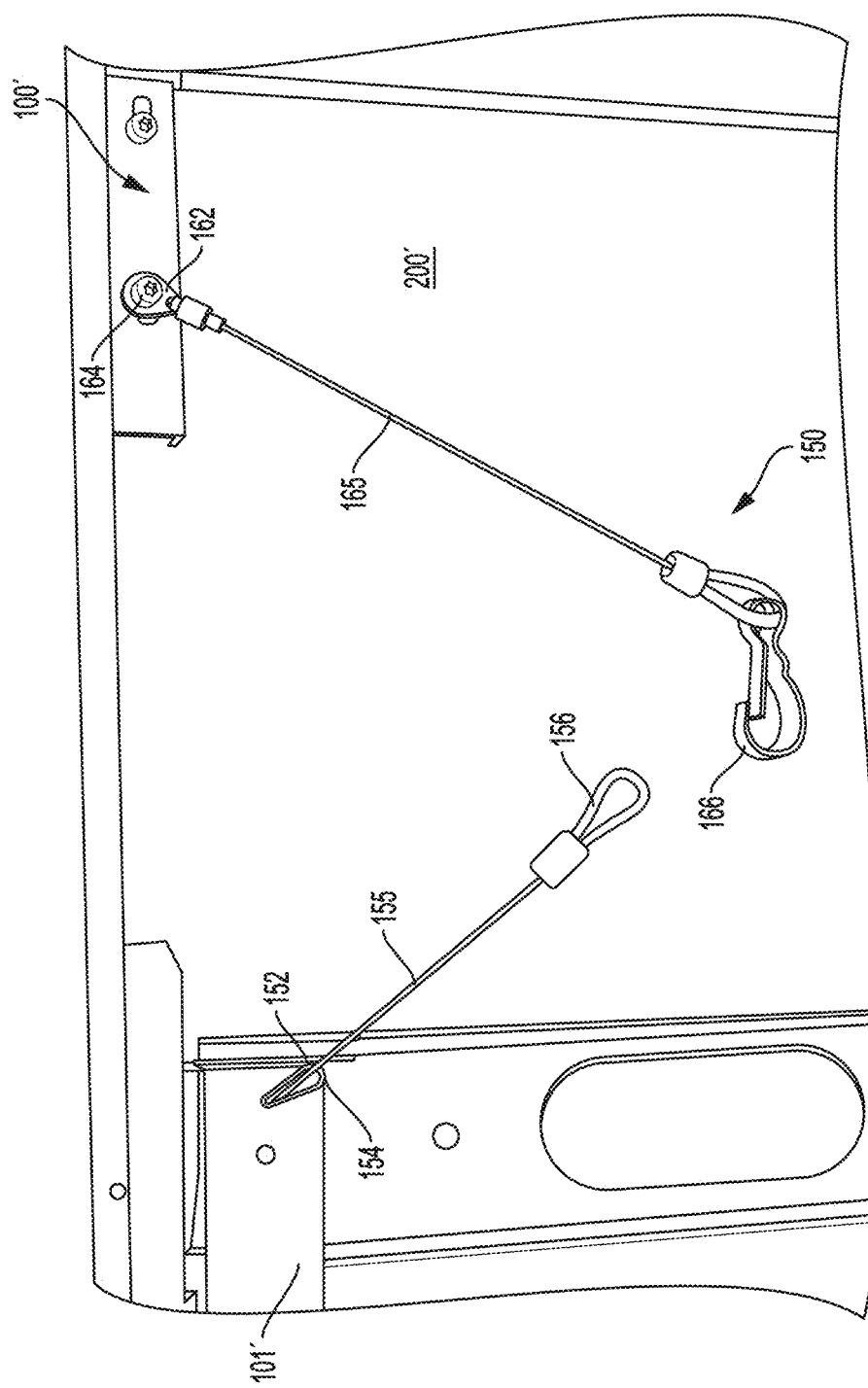
Figure 8:
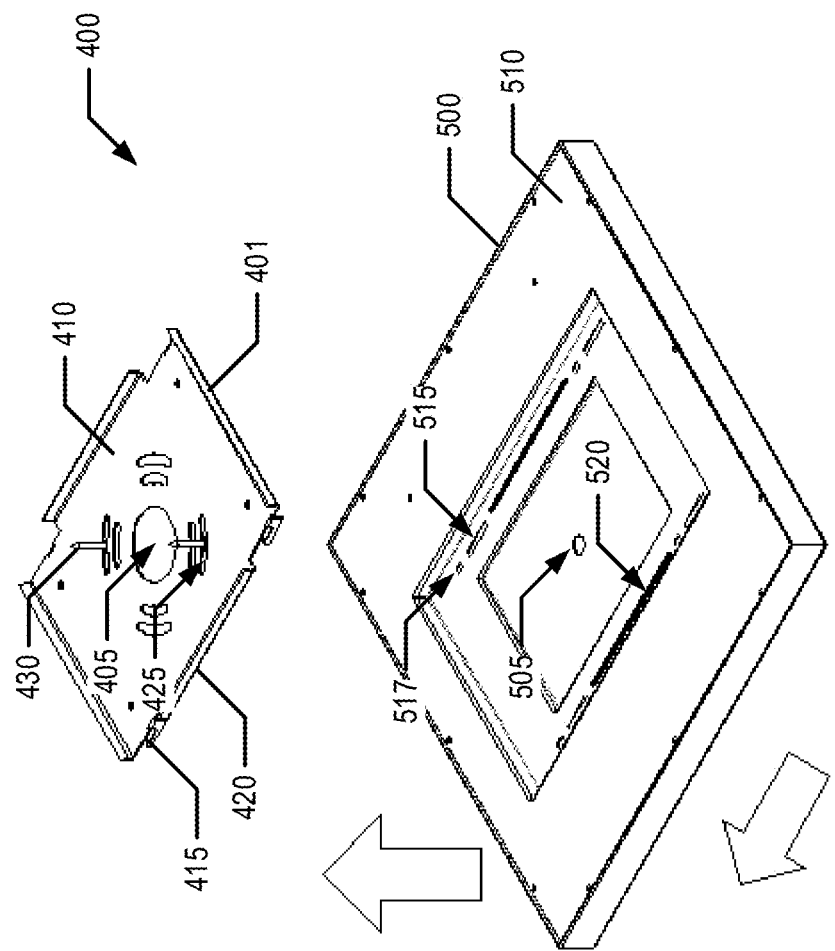
Figure 9:
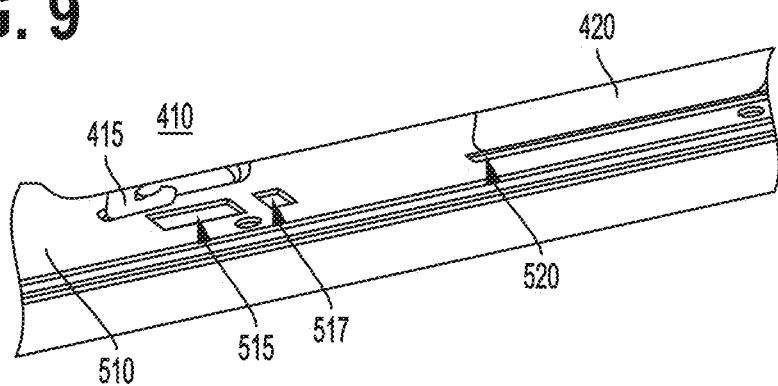
Figure 10:
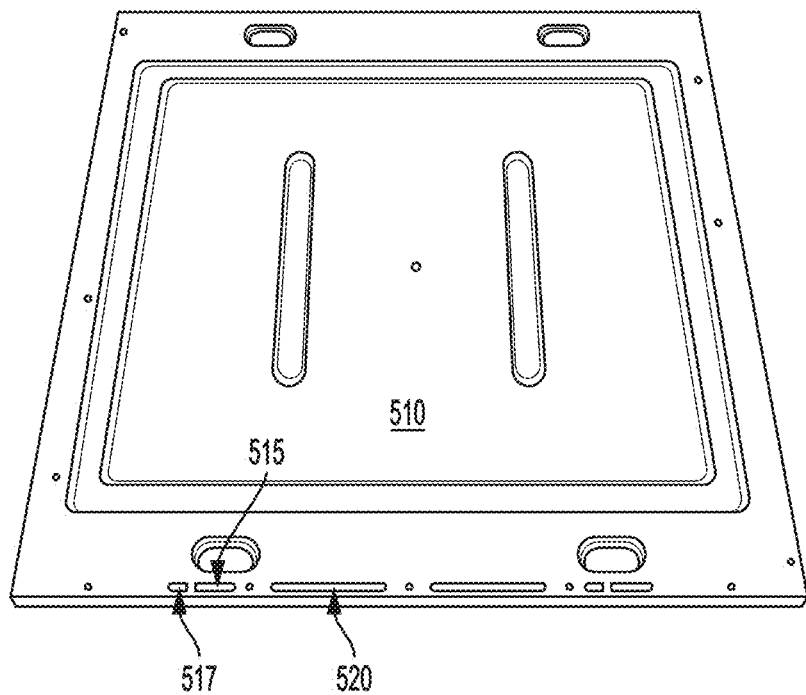
Figure 12D:
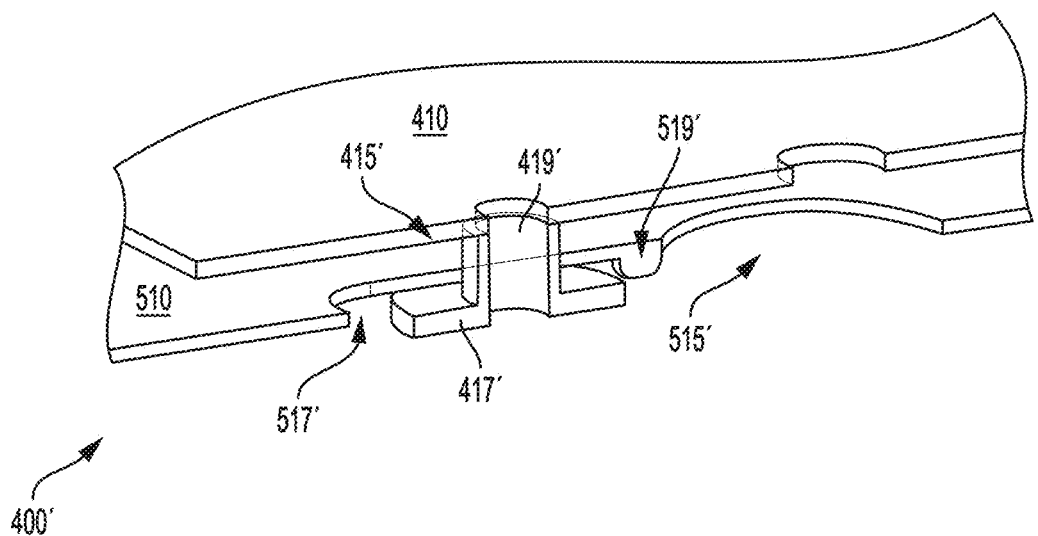
Figure 13:
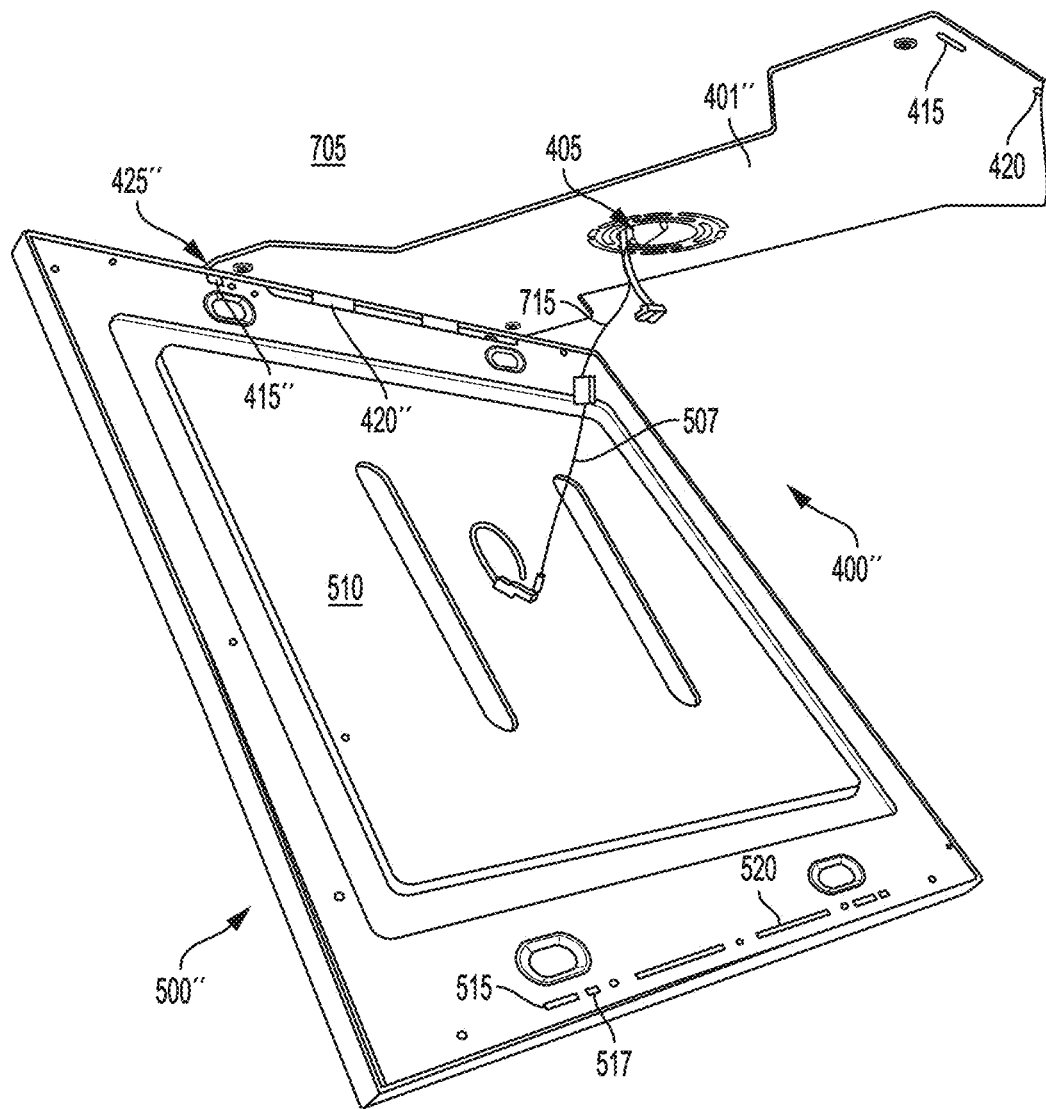
Figure 13B:
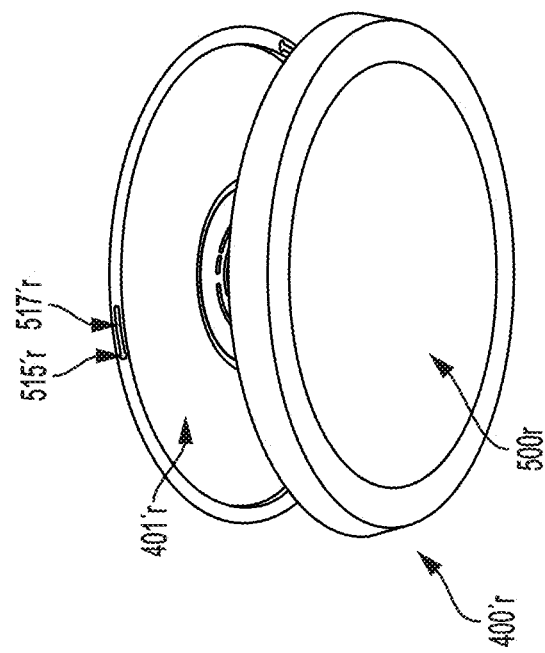
Figure 13A:
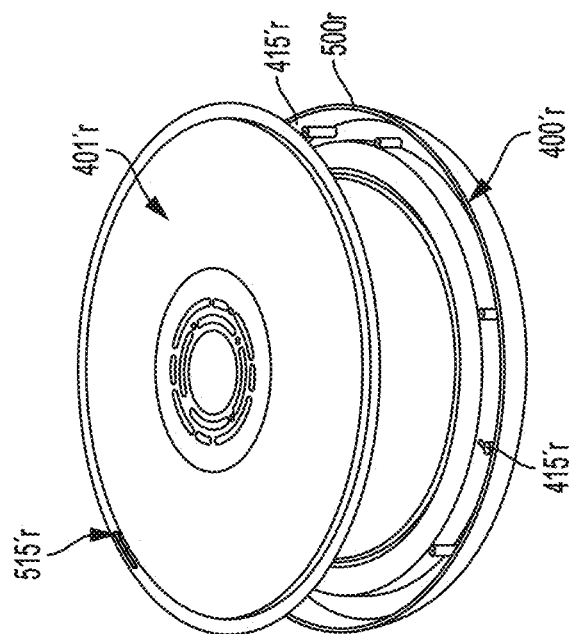
Figure 14:
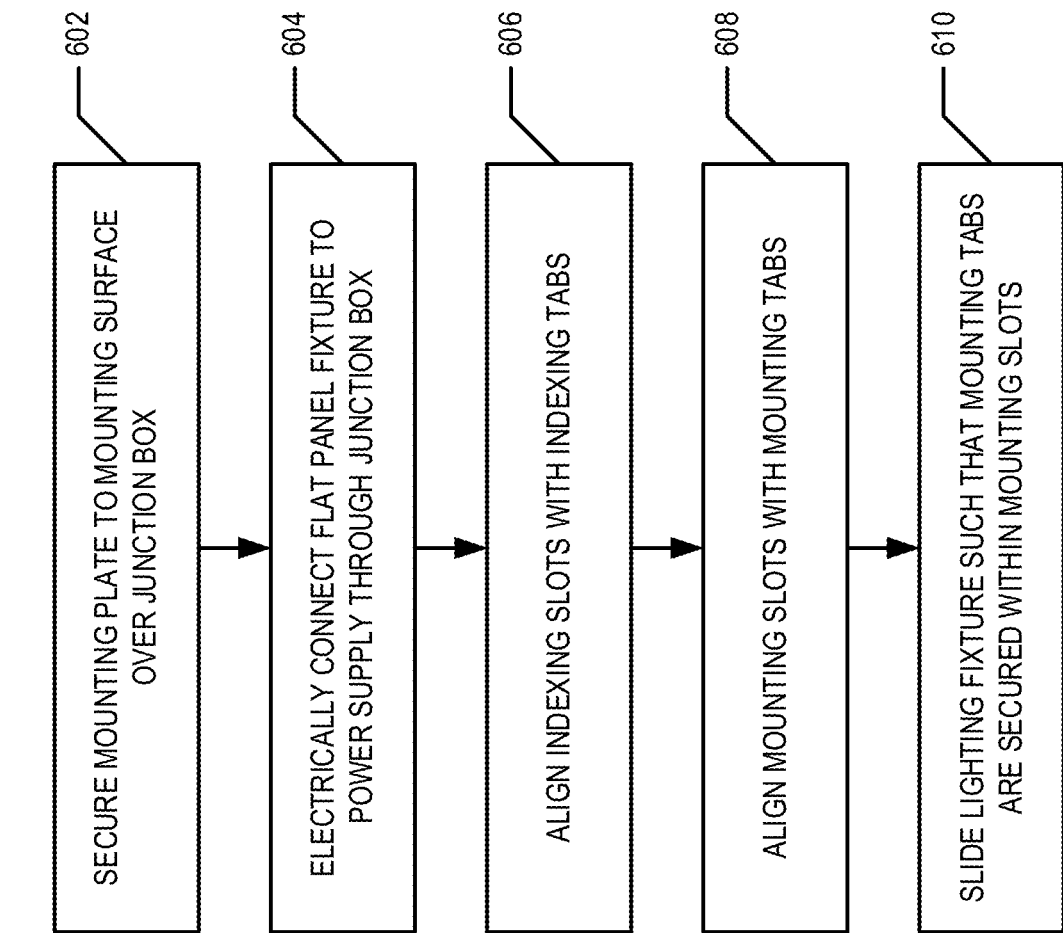
Figure 15:
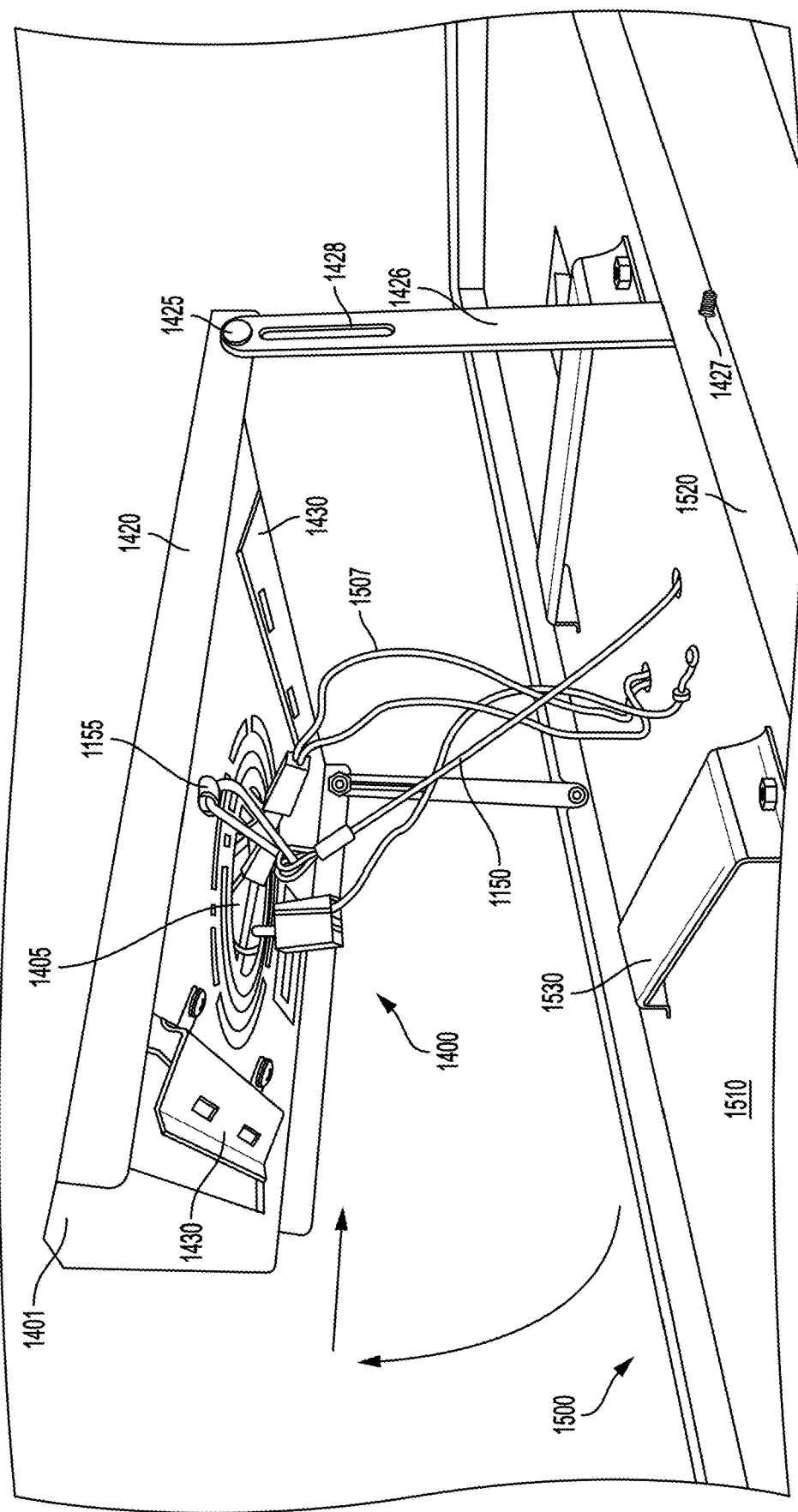

FIGS. 5A, 5B, and 5C show a front view, a side view, and a cross-sectional view, respectively, of a second frame portion of a mounting frame, in accordance with embodiments of the present invention;

FIGS. 6A and 6B shows perspective views of a lighting fixture being mounted to a mounting frame using a mounting harness, in accordance with an embodiment of the present invention;

FIG. 7 is a flowchart illustrating various operations and procedures for mounting a lighting fixture, in accordance with an embodiment of the present invention;

FIG. 8 is a partially exploded view of a mounting system, in accordance with an embodiment of the present invention;

FIG. 9 is a partial perspective view of an indexing tab and indexing slot being aligned, in accordance with an embodiment of the present invention;

FIG. 10 is a back view of a lighting fixture, in accordance with an embodiment of the present invention;

FIGS. 11A, 11B, and 11C provide a perspective view, side view, and a cross-sectional view of a mounting tab, in accordance with an example embodiment of the present invention;

FIG. 12A provides a perspective view of another embodiment of a mounting plate;

FIG. 12B provides a cross-section of a portion of the embodiment of the mounting plate shown in FIG. 12A;

FIG. 12C provides a back view of a lighting fixture configured to be mounted using the mounting plate shown in FIG. 12A;

FIG. 12D provides a cross section of a portion of the mounting system shown in FIGS. 12A and 12D;

FIGS. 13A and 13B are perspective views of still another embodiment of a mounting system;

FIG. 13 is a perspective view of yet another embodiment of a lighting fixture being mounted to a mounting surface by a mounting plate;

FIG. 14 is a flowchart illustrating various operations and procedures for mounting a lighting fixture, in accordance with an embodiment of the present invention; and FIG. 15 is a perspective view of yet another embodiment of a lighting fixture being mounted to a mounting surface by a mounting plate.

DETAILED DESCRIPTION OF EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

General Overview

Example embodiments of the present invention provide mounting systems and corresponding methods for mounting a lighting fixture to a mounting surface. In example embodiments, a mounting surface may be a ceiling or other substantially horizontal surface, or a wall or other substantially vertical surface. In example embodiments, of a mounting system comprise a mounting bracket that is configured to be mounted to a mounting surface. In example embodiments, the mounting bracket may be a mounting frame or a mounting plate. The mounting system may further comprise a lighting fixture configured to be secured to the mounting bracket. In example embodiments, the lighting fixture may be secured to the mounting bracket through various mechanisms such as snap in, slide in, and/or twist and lock mechanisms. For example, the mounting bracket may comprise one or more tabs configured to be inserted into one or more corresponding slots disposed on a back portion of the lighting fixture. In one embodiment, one or more tabs are disposed on the back portion of the lighting fixture and one or more corresponding slots are disposed in the mounting bracket.

Exemplary Mounting Frame Mounting System

Figure 1:
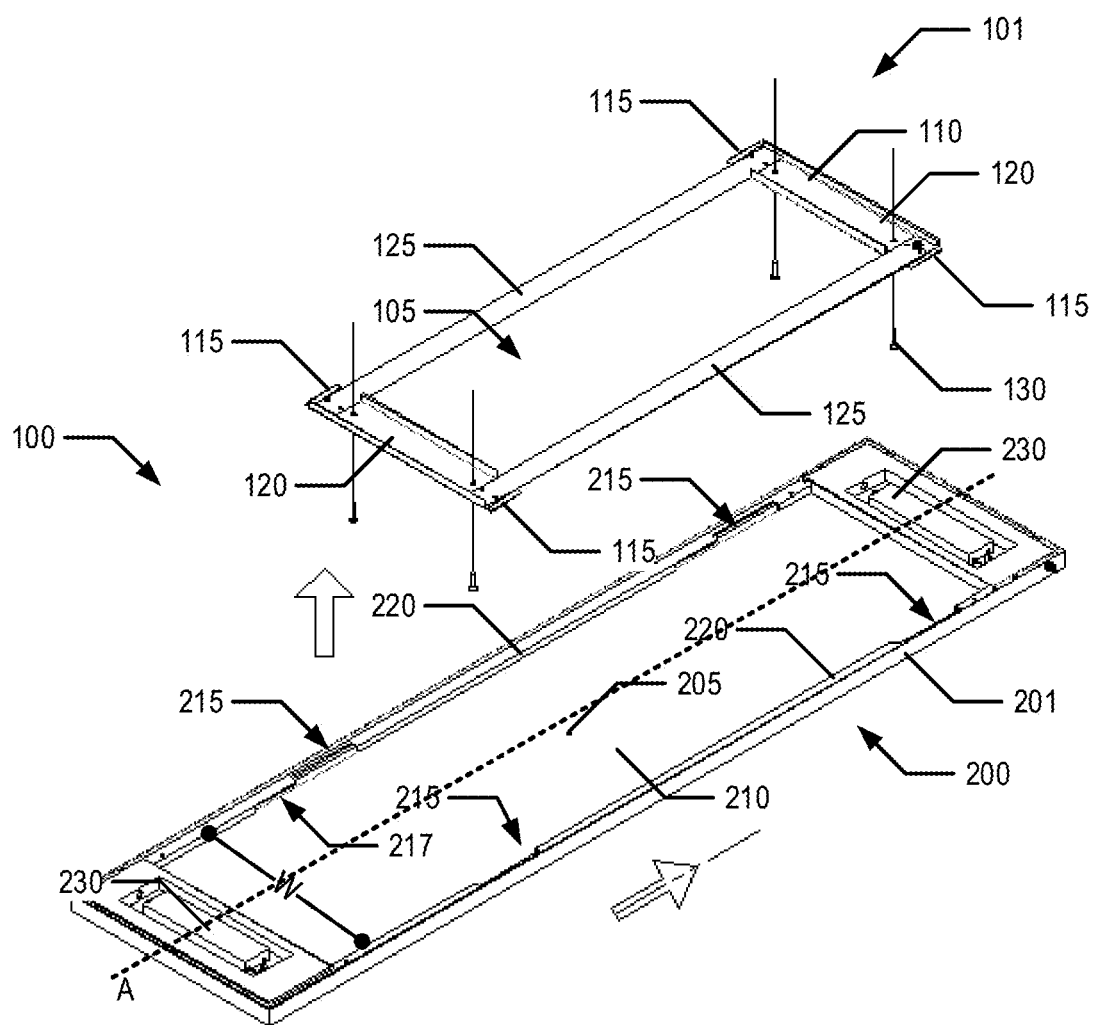
FIG. 1 is a partially exploded view of a mounting system, in accordance with an embodiment of the present invention.
Figure 2:
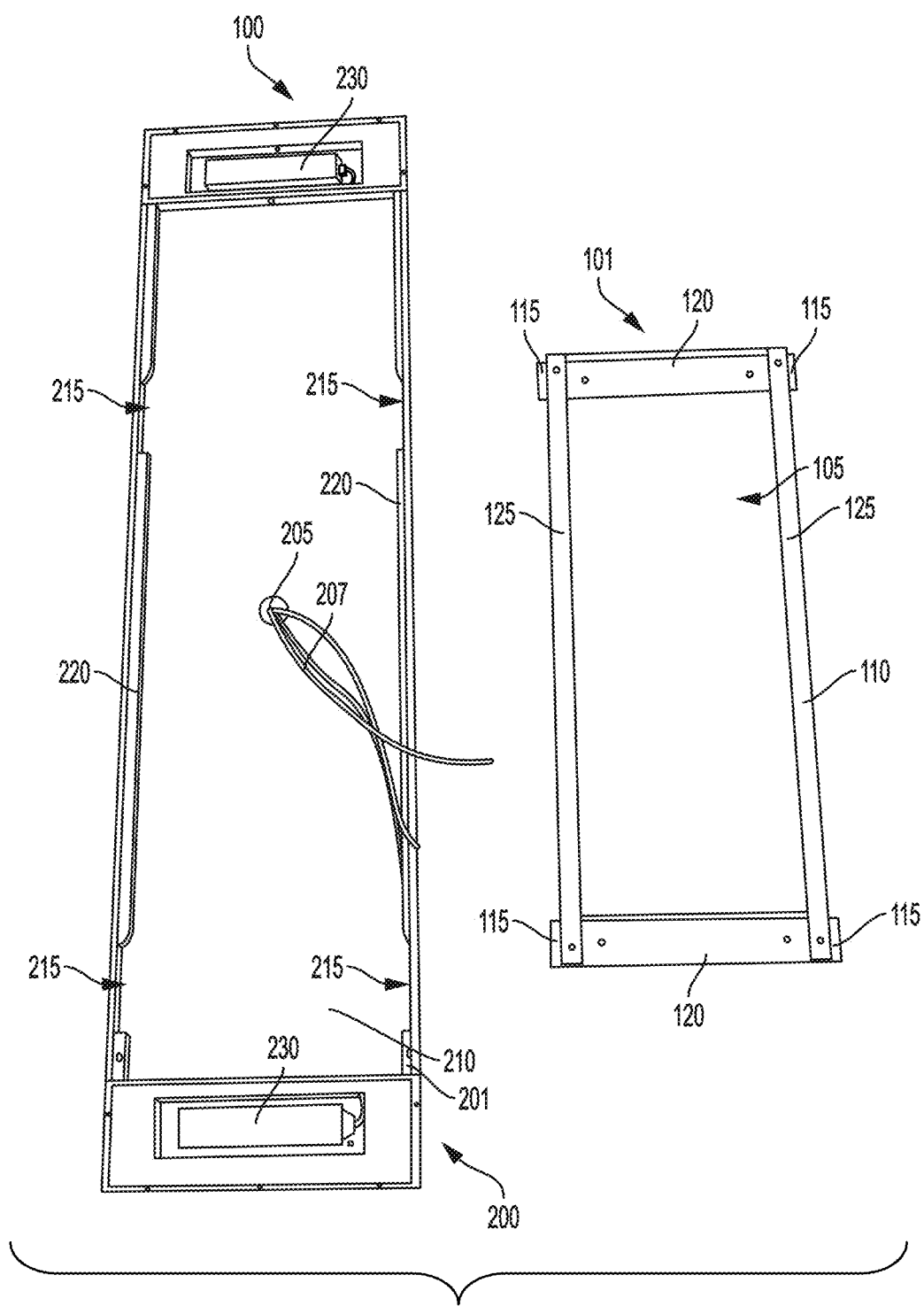
FIG. 2 is a perspective view of elements of a mounting system in accordance with an embodiment of the present invention.
Figure 3:
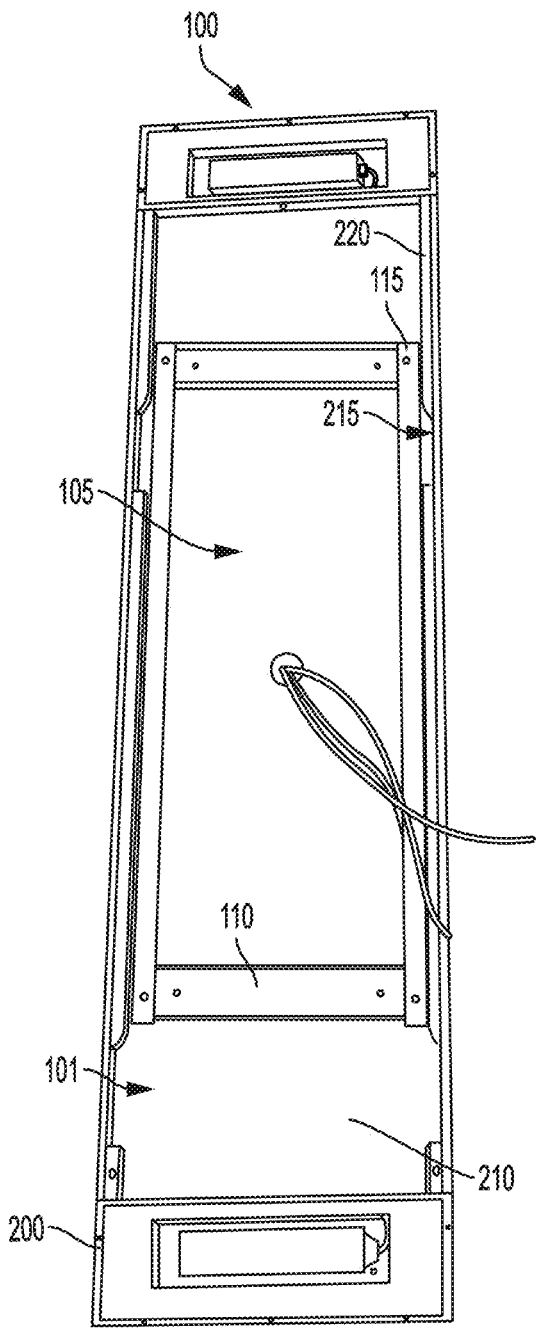
FIG. 3 is a perspective view of a lighting fixture secured to a mounting frame, in accordance with an embodiment of the present invention.

FIGS. 1, 2, and 3 illustrate various views of a mounting system 100 comprising a mounting frame 101 and a lighting fixture 200 and FIG. 4 illustrates a mounting frame 101 secured to a mounting surface 705. The mounting frame 101 may be configured to be secured to a mounting surface 705 such that a junction box 710 is accessible through a central opening 105 of the mounting frame 101. The mounting frame 101 may be configured to securely suspend the lighting fixture 200 therefrom. In yet other embodiments, mounting frame 101 may be configured to be secured relative to a can light (e.g., via a detachable can light adapter bracket as discussed in U.S. patent application Ser. No. 14/720,334, the contents of which are incorporated herein by reference in their entirety).

Exemplary Lighting Fixture 200

In example embodiments, the lighting fixture 200 is a flat panel lighting fixture. In example embodiments, the lighting fixture 200 may comprise one or more LED chips, LED modules, LED packages, LED lighting engine, and/or other lighting engine. For example, in some embodiments, the lighting fixture 200 is an LED flat panel lighting fixture. In example embodiments, the lighting fixture 200 may be rectangular or oval-shaped, though other shapes are also considered.

In example embodiments, the lighting fixture 200 may comprise a wire opening 205 disposed on the back portion 210 of the lighting fixture 200. The wire opening 205 may be configured to allow connecting wires 207 pass therethrough. In example embodiments, the connecting wires 207 are configured to electrically connect the lighting fixture 200 to a power supply (e.g., line voltage). For example, the connecting wires 207 may be configured to secured into electrical communication (e.g., with a quick connect connector, wire nuts, and/or the like) with wires 715 of a junction box 710 and/or a can light, and thereby provide line voltage to the lighting fixture 200.

In example embodiments, the lighting fixture 200 may comprise driver circuitry 230. For example, the connecting wires 207 may electrically connect the driver circuitry 230 to a power supply. For example, the driver circuitry 230 may comprise a circuit portion configured to convert AC voltage into DC voltage. In some embodiments, the driver circuitry 230 may comprise a circuit portion configured to control the current flowing through the one or more LED chips. In certain embodiments, the driver circuitry 230 may comprise a circuit portion configured to dim the lighting fixture 200. In various embodiments, additional circuit components may be present in the driver circuitry 230. Similarly, in various embodiments, all or some of the circuit portions mentioned here may not be present in the driver circuitry 230. In some embodiments, circuit portions listed herein as separate circuit portions may be combined into one circuit portion. As should be appreciated, a variety of driver circuitry 230 configurations are generally known and understood in the art and any of such may be employed in various embodiments as suitable for the intended application, without departing from the scope of the present invention. In example embodiments, the driver circuitry 230 may be disposed outside of the fixture frame 201.

In example embodiments, the lighting fixture 200 may comprise a fixture frame 201 and a back portion 210. In example embodiments, the back portion 210 is the side of the lighting fixture 200 opposite the portion of lighting fixture configured to provide and/or project light. In example embodiments, the fixture frame 201 may be disposed about a perimeter of the back portion 210. In example embodiments, the fixture frame 201 and/or back portion 210 may be made of plastic, aluminum, or other lightweight, rigid material appropriate for the application. In example embodiments, the fixture frame 201 may be configured and/or shaped for engagement and attachment with a mounting frame 101 (e.g., the frame portion 110, tabs 115, and/or the like).

The fixture frame 201 may comprise one or more support rails 220. The one or more support rails may be configured to support the lighting fixture 200 when the lighting fixture is suspended form one or more tabs 115 of a mounting frame 101. In example embodiments wherein the lighting fixture 200 defines an elongated axis A (e.g., parallel to the longer side of a rectangle or the major axis of an ellipse), the support rails 220 may be parallel to the elongated axis A. In example embodiments, the lighting fixture 200 comprises two support rails 220 and a first support rail 220 defines a first axis that is parallel to a second axis defined by the second support rail 220. For example, both the first axis and the second axis may be parallel to the elongated axis A and/or another axis of the lighting fixture 200. In some embodiments, the lighting fixture 200 may not have an elongated axis (e.g., the lighting fixture 200 may be square, round, hexagonal, and/or the like) or the support rails 220 may be parallel to a non-elongated axis of the lighting fixture 200 (e.g., a minor axis and/or the like). In an example embodiment having two support rails 220, the support rails 200 may be spaced apart by more than 50% of the width of the lighting fixture 200. For example, the first support rail 220 may be disposed along one edge of a perimeter of the back portion 210 and the second support rail 220 may be disposed along an opposite edge of the perimeter of the back portion 210.

In example embodiments, a support rail 220 may comprise one or more slots 215 therein. Each slot 215 may provide access to a tab recess 217 configured to receive a tab 115 of the mounting frame 101 therein. The one or more support rails 220 may have one or more slots 215 therein providing access to one or more tab recesses 217. For example, the lighting fixture 200 may comprise two support rails 200 and each support rail 200 may comprise two slots 215. Each slot 215 may correspond to a tab recess 217. In example embodiments, each tab recess may define a tab axis and each tab axis may be parallel to the first and second axes defined by the first and second support rails 220. Each tab recess 217 may be at least in part defined by a support rail 220, the back portion 210, and/or another portion of the fixture frame 201. In an example embodiment, each tab recess 217 at least partially defined by a support rail 220 is equidistant from a center point of the support rail 220. In another example embodiment, the tab recesses 217 are equally spaced along the support rail 220. For example, if a support rail 220 at least partially defines two tab recesses 217 and a first tab recess 217 is a distance d from a first end of the support rail 220, the second tab recess 217 is a distance d from the opposite end of the support rail 220.

In various embodiments, a surface of the tab recess 217 may be contoured such that as a tab 115 is slid into the tab recess 217 from the corresponding slot 215, a component of the tab's 115 movement is parallel to the support rail 220 that at least partially defines the tab recess 217 and another component of the tab's 115 movement is perpendicular to the support rail 220 such that the tab 115 moves closer to the back portion 210 as it is slides into the tab recess 217. For example, as the tab 115 is slid into the tab recess 217, the lighting fixture 200 may be pulled closer to the mounting surface to which the mounting frame 101 is secured by the contour of at least one surface of the tab recess 217.

Exemplary Mounting Frame 101

In example embodiments, the mounting frame 101 comprises a frame portion 110 configured to be secured to a mounting surface. For example, the frame portion may be secured to a mounting surface 705 by one or more mechanical fasteners 130 (e.g., screws, nails, bolts). In example embodiments, the frame portion 110 may be generally rectangular in shape. In some embodiments, the frame portion 110 may be shaped similarly to the lighting fixture 200. In example embodiments, the mounting frame 101 and/or the frame portion 110 may be configured and/or shaped for engagement and attachment with the lighting fixture 200 (e.g., the fixture frame 201).

The frame portion 110 may define a central opening 105. When the frame portion is mounted to a mounting surface 705, a junction box 710 (e.g., the junction box wires 715) may be accessible through the central opening 105. Generally a mounting bracket is centered on a junction box such that the lighting fixture mounted by the mounting bracket is centered on the junction box. Indeed, generally the mounting bracket may be secured to the junction box. However, the mounting frame 101 is not secured to the junction box and need not be centered on the junction box 710. Indeed, the junction box 710 may be located in a corner of the central opening 105, as shown in FIG. 4. Rather than centering the mounting frame 101 over the junction box 710, the mounting frame 101 may be mounted such that the junction box 710 (e.g., the junction box wires 715) is accessible through some portion of the central opening 105. Thus, the mounting frame 101 of the present invention provides an installer of the lighting fixture 100 a greater amount of flexibility regarding where to mount the lighting fixture 100 with respect to the junction box 710 and mounting surface 705. For example, an installer may choose to mount the lighting fixture 100 further from a wall where previously the junction box 710 location would have forced the installer to mount the lighting fixture 100 closer to the wall than desired or too close to the wall for the lighting fixture 100 to fit.

Moreover, as discussed herein, frame portion 110 may be secured relative to a can light, for example, via a detachable can light adapter bracket as discussed herein. For example, the frame portion 110 may be configured to be secured relative to a detachable can light adapter portion (e.g., via one or more fasteners) such that the frame portion 110 may be secured relative to a can light. In various embodiments, the frame portion 110 may be configured to be secured relative to a junction box 710 and/or support surface when the can light adapter portion is removed. For example, frame portion 110 may comprise one or more brackets configured to be secured relative to a junction box, such as those described in U.S. patent application Ser. No. 15/272,645, filed on Sep. 22, 2016, the contents of which are incorporated herein by reference in their entirety. In such embodiments, the frame portion may comprise one or more brackets configured to be secured relative to a junction box and/or relative to one or more can light adapter brackets configured to secure the frame portion relative to a can light.

In example embodiments, the frame portion 110 comprises a pair of first frame portions 125 and a pair of second frame portions 120. Each of the first frame portions 125 may be an elongated frame portion. For example, the first frame portion 125 may be generally rectangular in shape. For example, the first frame portion 125 may be made of aluminum or other lightweight metal or material appropriate for the application. The first frame portion 125 may be relatively thin. In example embodiments, the first frame portion 125 may be approximately an eighth of an inch to a quarter of an inch thick. In other embodiments, the first frame portion 125 may be thinner than an eighth of an inch (e.g., a sixteenth of an inch) or thicker than a quarter of an inch (e.g., three-eighths of an inch). In example embodiments, the length of the first frame portion 125 is approximately six inches to twenty inches. For example, the first frame portion 125 may be one foot long. In other embodiments, the first frame portion 125 may be shorter or longer as appropriate for the application. In example embodiments, the first frame portion 125 is approximately half an inch to three inches wide. First frame portions 125 of other widths may be used as appropriate for the application.

Each of the second frame portions 120 may be an elongated frame portion. For example, the second frame portion 120 may be generally rectangular in shape. For example, the second frame portion 120 may be made of aluminum or other lightweight metal or material appropriate for the application. The second frame portion 120 may be relatively thin, but thicker than the first frame portion 125. For example, at least a portion of the second frame portion 120 may be a quarter of an inch to half an inch thick, though in other embodiments, the second frame portion 120 may be thicker or thinner as appropriate for the application. In example embodiments, the length of the second frame portion 120 is approximately six inches to twenty inches. For example, the second frame portion 120 may be nine inches long. In some embodiments, the second frame portion 120 is shorter than the first frame portion 120. In example embodiments, the second frame portion 120 is approximately half an inch to three inches wide. Second frame portions 120 of other widths may be used as appropriate for the application.

In some embodiments, the second frame portion 120 is a solid piece of material and in other embodiments, the second frame portion 120 may comprise, for example, a one eighth inch thick sheet of metal that has been bent to create three sides of a rectangular prism. For example, FIGS. 5A, 5B, and 5C show an example embodiment of a second frame portion 120. For example, the second frame portion 120 may comprise a main portion 122, an inner bent portion 123 and an outer bent portion 124. For example, the inner bent portion 123 and the outer bent portion 124 may extend outward from the main portion 122. For example, the inner bent portion 123 and the outer bent portion 124 may be approximately normal to the main portion 122. The inner bent portion 123 may not extend as far along the length of the second frame portion 120 to allow the first frame portion 120 to overlap with the main portion 122 of the second frame portion 120. In example embodiments, the length of the outer bent portion 124 may be configured such that the outer bent portion 124 does not get caught on the supporting rail 220 as the lighting fixture 200 is being mounted on to the mounting bracket 101. For example, the maximum length of the outer bent portion 124 may be determined by the distance W between the interior edges of the supporting rails 220 (e.g., along an axis perpendicular to the elongated axis A of the lighting fixture 200), as shown in FIG. 1. The inner and out bent portions 123, 124 may be configured to add structural integrity to the second frame portion 120 and the frame portion 110. In example embodiments, the second frame portion 120 may further comprise one or more fastener holes 132 configured to receiving a fastener 130 therethrough such that the fastener 130 may secure the second frame portion and/or the mounting frame 101 to the mounting surface 705.

The second frame portion 120 may further comprise one or more tabs 115. For example, at each end of the elongated frame portion, the second frame portion 120 may comprise a tab 115. For example, the outer and inner bent portions 123, 124 may not extend along the entire length of the main portion 122 such that at least one end portion of the second frame portion 120 only comprises the main portion 122. This end portion of the second frame portion 120 is a tab 115. The tabs 115 may be configured to be slide through a slot 215 into a tab recess 217 of the lighting fixture 200. For example, the tabs 115 may be configured to suspend the lighting fixture 200 therefrom by engaging a support rail 220 or other surface of the tab recess 217.

In the illustrated example embodiment, the tab 115 comprises a wedge 117. The wedge 117 may be configured to pull the lighting fixture 200 toward the mounting frame 101 and/or the mounting surface 705 as the tab 115 is slid into the tab recess 217. For example, the wedge 117 may engage a portion of the fixture frame 201 or back portion 210, causing the lighting fixture 200 to be pulled toward the mounting frame 101 and/or the mounting surface 705. In an example embodiment, the wedge 117 is approximately one-eighth of an inch thick at the widest part of the wedge. For example, the wedge 117 may be configured to reduce the gap between the lighting fixture 200 and the mounting surface 705 by up to approximately one-eighth of an inch. The wedge 117 may have a maximum thickness of more or less than one-eighth of an inch in various embodiments, as appropriate for the application.

Each first frame portion 125 may be configured to be fixedly secured to two second frame portions 120. For example, each end of the elongated first frame portion may be configured to be fixedly secured to a second frame portion 120. Similarly, each second frame portion 120 may be configured to be fixedly secured to two first frame portions 125. For example, a pair of first frame portions 125 and a pair of second frame portions 120 may be fixedly secured together to form a quadrilateral. For example, the pair of first frame portions 125 and the pair of second frame portions 120 may be fixedly secured together to form a rectangle. For example, a pair of first frame portions 125 and a pair of second frame portions 120 may be fixedly secured to one another to define a quadrilateral and/or rectangular central opening 105. In example embodiments, the tabs 115 may extend outward from an exterior perimeter of the quadrilateral and/or rectangle formed by fixedly securing the first pair of first frame portions 125 to the pair of second frame portions 120 and lie in approximately the same plane as the quadrilateral and/or rectangle. For example, the tabs 115 may extend outward from the quadrilateral and/or rectangle approximately a quarter of an inch to two inches. In example, embodiments, a first frame portion 125 may be secured to a second frame portion 120 by a weld 128, a mechanical fastener, and/or the like.

When the mounting frame 101 is secured to the mounting surface 705, a side of the first frame portions 125 may be flush against the mounting surface 705. In some embodiments, an edge surface of the inner bent portion 123 and an edge surface of the outer bent portion 124 are flush against the mounting surface 705. In example embodiments, a gap may exist between a tab 115 and the mounting surface 705, such that a support rail 220 of the lighting fixture 200 may be slid between the tab and the mounting surface 705 with the lighting fixture is secured to the mounting frame 101. In some embodiments, the tab 115 defines a plane that is generally parallel to a plane defined by the mounting surface 705 when the mounting frame 101 is secured to the mounting surface 705.

Exemplary Mounting Harness

FIGS. 6A and 6B illustrate an example embodiment of a mounting system 100' comprising a mounting harness 150. In example embodiments, a mounting harness 150 comprises a frame cable 155 secured to a mounting frame 101' and a fixture cable 165 secured to a lighting fixture 200'. The frame cable 155 and the fixture cable 165 may be secured to one another by loop 156 and clip 166. For example, the loop 156 may be inserted into clip 166 to secure the frame cable 155 to the fixture cable 165. In the illustrated embodiment, the clip 166 is attached to the fixture cable 165. In other embodiments, the clip 166 is attached to the frame cable 155. In example embodiments, a mounting harness 150 may comprise two sets of fixture and frame cables 155, 165. For example, a mounting harness 150 may be configured to secure two different corners of mounting system 101' to the corresponding two corners of a lighting fixture 200'.

In example embodiments, the mounting frame 101' may be a mounting frame 101 having one or more frame cables 155 secured thereto. For example, a frame cable 155 may be secured to an outer bent portion 124. For example, a screw 154 may secure a loop 152 of the frame cable 155 to an outer bent portion 124 or other portion of the mounting frame 101'. In various embodiments the one or more frame cables 155 may be secured to the mounting frame 101' by various methods, as appropriate for the application.

In example embodiments, the lighting fixture 200' may be a lighting fixture 200 having one or more fixture cables 165 secured thereto. For example, a fixture cable 165 may be secured to the support rail 220 or other portion of the fixture frame 201. For example a screw 164 my secure a loop 162 of the fixture cable 165 to a support rail 220 or other portion of the fixture frame 201. In various embodiment the one or more fixture cables 165 may be secured to the lighting fixture 200' by various methods, as appropriate for the application.

In various embodiments, the mounting harness 150 may be configured to allow a single installer to mount the lighting fixture 200'. For example, the mounting harness 150 may support the weight of the lighting fixture 200' while an electrical connection is made between the connecting wires 207 and the junction box wires 715. In an example embodiment, the length of the combined cable (e.g., the fixture cable 165 secured to the corresponding frame cable 155) may be approximately nine inches. In other embodiments, the length of the combined cable may be shorter or longer than nine inches as appropriate for the application. In various embodiments, the mounting harness 150 may be left intact (e.g., the fixture cable 165 may continue to be secured to the corresponding frame cable 155) when the lighting fixture 200' is secured to the mounting frame 101'.

Mounting a Lighting Fixture with a Mounting Frame

FIG. 7 provides a flowchart illustrating processes and procedures for installing a lighting fixture 200, 200' using the mounting system 100, 100'. Starting at step 302, the installer(s) may secure the mounting frame 101, 101' to the mounting surface 705. For example, an installer may secure the mounting frame 101, 101' to the mounting surface 705 with one or more fasteners 130 secured to the surface 705 such that the junction box 710 (e.g., the junction box wires 715) are accessible through the central opening 105. As discussed herein, in certain embodiments, the installer may secure the mounting frame 101, 101' relative to a can light. In such embodiments, the installer may secure the can light adapter portion relative to the mounting frame 101, 101', and may secure the can light adapter portion with the secured mounting frame, relative to an existing can light fixture within a support surface. For example, the can light adapter portion may be configured to snap into can light, as discussed in previously mentioned application Ser. No. 14/720,334.

Optionally, at step 304, the installer(s) may mechanically connect the lighting fixture 200' to the mounting frame 101' using a mounting harness 150. For example, the installer(s) may secure one or more frame cables 155 to corresponding one or more fixture cables 165. The lighting fixture 200' may be allowed to hang from the attached frame and fixture cables 155, 165, allowing the installer(s) to access the connecting wires 207 and the junction box wires 715 while the lighting fixture 200' is held in an appropriate position for an electrical connection to be made between the connecting wires 207 and the junction box wires 715. Thus, use of the mounting harness 150 may allow a single installer to efficiently and safely mount the lighting fixture 200' to the mounting surface 705.

At step 306, the installer(s) may electrically connect the lighting fixture 200, 200' to a power supply. For example, the installer(s) may electrically connect the connecting wires 207 to the junction box wires 715 (and/or a can light electrical connector, socket, and/or the like) so as to provide line voltage to the driver circuitry 230 and/or other electrical components of the lighting fixture 200, 200'. For example, the installer may electrically connect the connecting wires 207 to the junction box wires 715 with quick connect connectors, wire nuts, and/or the like. In example embodiments, the connecting wires 207 may be configured such that the portion of the connecting wires 207 that makes the electrical connection to the junction box wires 715 may be positioned within the junction box 710 after the electrical connection has been made.

At step 308, the slots 215 of the lighting fixture 200, 200' may be aligned with the tabs 115 of the mounting frame 101, 101'. For example, the installer(s) may align the slots 215 of the lighting fixture 200 with the tabs 115 of the mounting frame 101, 101'.

At step 310, the lighting fixture 200, 200' may be slid such that each tab 115 slides into a corresponding tab recess 217 through the corresponding slot 215. For example, the installer(s) may slide the lighting fixture 200, 200' such that each tab 115 slides into a corresponding tab recess 217 through the corresponding slot 215. In example embodiments, as the lighting fixture 200, 200' is slid such that the tabs 115 slide into the corresponding tab recesses 217, the lighting fixture 200, 200' may be pulled toward the mounting surface 705. For example, based on the contour of the tab recesses 217 and/or the wedge 117, a component of the lighting fixtures 200, 200' movement may be parallel to the length of the lighting fixture 200, 200' and/or the elongated axis A and another component of the lighting fixture's 200 movement is perpendicular to the elongated axis A and toward the mounting surface 705. For example, as the tab 115 is slid into the tab recess 217, the lighting fixture 200, 200' may be pulled closer to the mounting surface 705 to which the mounting frame 101 is secured by the contour of at least one surface of the tab recess 217 and/or the wedge 117. For example, due to the contour of a defining surface of each of the tab recesses 217 or the wedge 117, as the tabs 115 are slid into the corresponding tab recesses 217, a space between the mounting surface 705 and the back portion 210 of the lighting fixture 200, 200' is reduced.

Exemplary Mounting Plate Mounting System

FIGS. 8, 9, 10 11A, 11B, and 11C illustrate various views of a mounting system 400 comprising a mounting plate 401 and a lighting fixture 500. The mounting plate 401 may comprise one or more indexing tabs 420 configured to be aligned with one or more indexing slots 520 disposed on back portion 510 of a lighting fixture 500. The indexing tabs 420 and indexing slots 520 may be configured to allow an installer to easily align the mounting tabs 415 to the mounting slots 515 to secure the lighting fixture 500 to the mounting plate 401. The mounting plate 401 may be configured to securely suspend the lighting fixture 500 therefrom.

Exemplary Lighting Device 500

In example embodiments, the lighting fixture 500 is a flat panel lighting fixture. In example embodiments, the lighting fixture 500 may comprise one or more LED chips, LED modules, LED packages, LED lighting engine, and/or other lighting engine. For example, in some embodiments, the lighting fixture 500 is an LED flat panel lighting fixture. In example embodiments, the lighting fixture 500 may be rectangular or square, though other shapes are also considered.

In example embodiments, the lighting fixture 500 comprises a back portion 510. The back portion 510 may be made of plastic, aluminum, or other appropriate material. In example embodiments, the back portion 510 may be configured and/or shaped for engagement and attachment with a mounting plate 401. In example embodiments, the back portion 510 may comprise one or more mounting slots 515, one or more locking slots 517, and/or one or more indexing slots 520. For example, one or more mounting slots 515, one or more locking slots 517, and/or one or more indexing slots 520 may be disposed in the back portion 510. For example, one or more mounting slots 515, one or more locking slots 517, and/or one or more indexing slots 520 may extend through the back portion 510 of the lighting fixture 500.

In example embodiments, a mounting slot 515 may be configured to receive therethrough a mounting tab 415. For example, in one embodiment, a mounting slot may measure approximately 4.8 mm by 28 mm, although other sized slots may be used as appropriate for the application. For example, a mounting tab 415 may be inserted into the mounting slot 515 and slid until a locking portion 417 of the mounting tab 415 engages the locking slot 517. In example embodiments, the locking slot 517 may be configured to receive therethrough a locking portion 417 of a mounting tab 415. In example embodiments, the locking slot 517 may be similar in width to the mounting slot 515, but shorter in length. In example embodiments, the mounting slot 515 and the locking slot 517 are configured such that when the locking portion 417 of the mounting tab 415 is engaged within the locking slot 517, the mounting tab 415 is securely engaged with the back portion 510 of the lighting fixture 500 such that the lighting fixture 500 may be securely suspended from the mounting plate 401.

In example embodiments, the back portion 510 may further comprise one or more indexing slots 520. In example embodiments, an indexing slot 520 is configured to receive an indexing tab 420 therein. In example embodiments, the indexing tab 420 does not engage the indexing slot 520 to suspend or partially suspend the lighting fixture 500 therefrom. Rather, the indexing slot is configured to receiving an indexing tab 420 therein to aid the installer(s) in aligning the mounting tabs 415 and the mounting slots 515. In example embodiments, the indexing slots 520 may be longer than the corresponding indexing tab 420 such that the indexing tab 420 may be slid along the indexing slot 520 when the mounting tab 415 is slid into the mounting slot 515 and into engagement with the locking slot 517. For example, the length of the indexing slot 520 may be determined such that when the indexing tab 420 is positioned at a first end of the indexing slot 520, a mounting tab 415 is aligned with a mounting slot 515 and when the indexing tab 420 is positioned at an opposite end of the indexing slot 520, the locking portion 417 may fully engage the locking slot 517.

In example embodiments, each indexing slot 520 and each mounting slot 515 may define a slot axis. The set of slot axes defined by the indexing slot(s) 520 and the mounting slot(s) 515 may be mutually parallel. For example, a first mounting slot 515 may define a first slot axis that is parallel to a second slot axis defined by a second mounting slot 515 and/or an indexing slot 520. In an example embodiment, the mounting slots 515 and/or indexing slots 520 are disposed adjacent the perimeter of the back portion 510. For example, in one embodiment, two mounting slots 515 and two indexing slots 520 are disposed adjacent a first edge of the perimeter of the back portion 510 and two mounting slots 515 and two indexing slots 520 are disposed adjacent an opposite edge of the perimeter of the back portion 510.

In example embodiments, the back portion 510 of the lighting fixture 500 may further comprise one or more wire openings 505 configured to allow electrical connecting wires to pass through the back portion 510. The wire opening 505 may be configured to allow connecting wires to pass therethrough. In example embodiments, the connecting wires are configured to electrically connect the lighting fixture 500 (e.g., driver circuitry and/or other electrical components of the lighting fixture 500) to a power supply (e.g., line voltage). For example, the connecting wires may be configured to be secured into electrical communication (e.g., with a quick connect connector, wire nuts, and/or the like) with junction box wires 715 of a junction box 710 and thereby provide line voltage to the lighting fixture 500.

Exemplary Mounting Plate 401

In example embodiments, a mounting plate 401 may be configured to be secured to a mounting surface 705 about a junction box 710 and have a lighting fixture 500 securely suspended therefrom. In example embodiments, a mounting plate 410 may be made of aluminum or another metal, plastic, or other appropriate material for the application.

In example embodiments, a mounting plate 401 comprises a plate portion 410. In example embodiments, the plate portion 410 may be generally rectangular and/or square. In example embodiments, the plate portion 410 is configured to be secured to a mounting surface 705. For example, the plate portion 410 may comprise fastener openings 425 configured to receive a fastener 430 therethrough to securely mount the mounting plate 401 to the mounting surface 705. In example embodiments, the plate portion 410 may further comprise a central opening 405 configured to allow connecting wires and/or junction box wires 715 pass therethrough. In example embodiments, the mounting plate 401 is mounted to the mounting surface 705 such that a junction box 710 (e.g., junction box wires 715) are accessible through the central opening 405. In yet other embodiments, plate portion 410 may be configured to be secured relative to a junction box and/or a can light (e.g., via a detachable can light adapter bracket as discussed in previously mentioned application Ser. No. 14/720,334). In such embodiments, the interior of the can light (and thus electrical connection of the can light) may be accessible via the central opening 405 such that the lighting fixture 500 may be electrically connected to the can light.

In example embodiments, a mounting plate 401 may comprise mounting tabs 415 configured for suspending a lighting fixture 500 therefrom. In example embodiments, the mounting plate 401 may be configured and/or shaped for engagement and attachment with a lighting fixture 500 and/or a back portion 510. In an example embodiment, a mounting plate 401 may comprise four mounting tabs 415, with each mounting tab 415 generally disposed in a corner of the plate portion 410. For example, two mounting tabs 415 may be positioned along a first edge of a perimeter of the plate portion 410 and two mounting tabs 415 may be positioned along an opposite edge of the perimeter of the plate portion 410. The mounting tabs 415 may generally extend outwardly from the plate portion 410. For example, the mounting tabs 415 may extend out from the plate portion 410 such that the mounting tab 415 extends generally normal and/or perpendicular to a plane defined by the plate portion 410. In example embodiments, the mounting tabs 415 may be reinforced such that the angle between the plate portion 410 and the mounting tab 415 may be maintained. For example, a mounting tab 415 may comprise an angle reinforcement 418 configured to maintain the angle between the plate portion 410 and the mounting tab 415.

In example embodiments, a mounting tab 415 may further comprise an elongated portion 419 that defines a plane that is generally perpendicular with a plane defined by the plate portion 410. In an example embodiment, the length L of the elongated portion 419 is approximately 23 mm. In other embodiments, the elongated portion 419 may be shorter or longer as appropriate for the application. In example embodiments, the elongated portion 419 may be reinforced by an elongated reinforcement 416 configured to prevent the elongated portion 419 from bending or twisting. For example, the elongated reinforcement 416 may define a plane that is generally parallel to the plane defined by the plate portion 410. In an example embodiment, the width W of the elongated reinforcement 416 is approximately 4 mm, though other widths may be used as appropriate for the application.

In example embodiments, a mounting tab 415 may comprise a locking portion 417. For example, the locking portion 417 may be a protrusion from the elongated portion 419 that extends back toward the plate portion 410. The locking portion 417 may be configured to engage a locking slot 517 of the lighting fixture 500 to securely suspend the lighting fixture 500 from the mounting tab 415. For example, the locking portion 417 may be configured to engage the locking slot 517 such that the mounting tab 415 cannot inadvertently slide back out through the mounting slot 515. In example embodiments, the locking portion 417 defines the same plane as the elongated portion 419. For example, the locking portion 417 and the elongated portion 419 of the same mounting tab 415 are co-planar.

FIGS. 12A, 12B, 12C, 12D show an alternative embodiment of a mounting system 400' that is similar to mounting system 400 but wherein the mounting tabs 415' are T-posts and the corresponding mounting slots 515' are keyhole shaped. Thus, the mounting tabs 415' comprise a post portion 419' and a disc portion 417'. The post portion 419' extends away from and/or perpendicularly out from the plane defined by the back portion 410 of the mounting plate 401'. One end of the post portion 419' is secured to the back portion 410 and the disc portion 417' is secured to the opposite end of the post portion 419'. The disc portion 417' defines a plane that is generally parallel to the back portion 410.

In the illustrated embodiment, the post portion 419' is generally cylindrical, though other shapes are contemplated. In the illustrated embodiment, the disc portion 417' is generally circular, though other shapes are contemplated. As shown in FIGS. 12A and 12B, the diameter of the disc portion 417' is larger than the diameter of the post portion 419'. In general, the projection of the disc portion 417' onto a plane parallel to the plane defined by the back portion 410 is larger than projection of the end of the post portion 419' onto a plane parallel to the plane defined by the back portion 410.

The mounting slot 515' may be sized such that the disc portion 417' may fit therethrough. Once, the disc portion 417' is through the mounting slot 515', with a portion of the post portion 419' within the mounting slot 515', the mounting tab 415' may be slid along the locking portion 517' of the mounting slot 515' such that the post portion 419' passes through the locking portion 517'. The locking portion 517' is sized such that the disc portion 417' cannot pass there through. For example, the width of the locking portion 517' (e.g., the dimension of the locking portion 517' perpendicular to the elongated axis thereof) is smaller than the diameter of the disc portion 417'. Additionally, the a stopper 519' may be positioned along interior surface of the back portion 510 such that once the disc portion 417' has been slid along the locking portion 517' and released by the installer so that the weight of the lighting fixture 500' is suspended from the disc portions 417' of the mounting plate 401', the mounting tab 415' will not be prevented from sliding along the locking portion 517' by engagement of the disc portion 417' with the stopper 519'.

FIGS. 13A and 13B show still another embodiment of a mounting system 400'r. Mounting system 400'r is similar to mounting system 400', but the lighting fixture 500r and the mounting plate 401'r are round. Additionally, the mounting slots 515'r are disposed on the mounting plate 401'r and the mounting tabs 415'r are disposed on the lighting fixture 500r. In particular, the mounting tabs 415'r are T-post mounting tabs similar to mounting tabs 415'. The mounting slots 515'r are similar to the keyhole mounting slots 515', but are shaped in an arcuate manner. For example, the keyhole mounting slots 515'r are shaped such that the mounting tab 415'r may be positioned through the keyhole mounting slots 515'r and then the lighting fixture 500r may be secured to the mounting plate 401'r by rotating the lighting fixture 500r such that the mounting tabs 415'r rotate along the keyhole mounting slots 515'r into the locking portion 517'r of the keyhole mounting slots 515'r. For example, a keyhole mounting slots 515'r may define a radial arc of length 5-90 degrees. Thus, the lighting fixture may be rotated through n degrees to secure the lighting fixture 500r to the mounting plate 401'r, where n degrees is approximately the arc length of the mounting slots 515'r. In example embodiments, the mounting plate 401'r may comprise two, three, four, or more mounting slots 515'r and the lighting fixture 500r may comprise two, three, four, or more corresponding mounting tabs 415'r.

Returning to FIGS. 8, 9, 10 11A, 11B, and 11C, in example embodiments, the mounting plate 401 further comprises one or more indexing tab 420. For example, an indexing tab may extend outward from the plate portion 410. For example, an indexing tab may define a plane that is generally perpendicular to a plane defined by the plate portion 410 and exactly or generally parallel to a plane formed by the elongated portion 419 of a mounting tab 415. In an example embodiment, the mounting plate 401 may comprise two or more indexing tabs 420 and two or more mounting tabs 415. Each indexing tab 520 may define a plane and each elongated portion 419 of the mounting tabs 415 may define a plane. The set of planes defined by the indexing tabs 420 and the elongated portions 419 of the mounting tabs 415 may be mutually parallel. For example, a first plane defined by a first indexing tab 420 may be parallel to a second plane defined by a second indexing tab 420 and/or an elongated portion 419 of a mounting tab 415.

In example embodiments, the indexing tab 420 may be longer than mounting tab 415. For example, an indexing tab 420 may extend further from the mounting plate 401. For example, when a lighting fixture 500 is being secured to a mounting plate 401, as the lighting fixture 500 is being moved toward the mounting plate 401, the indexing tabs 420 will engage the indexing slots 520 before the mounting tabs 415 engage the mounting slots 515. The indexing tabs 420 may be configured such that aligning the indexing tabs 420 with the indexing slots 520 causes the lighting fixture 500 to be in the appropriate orientation for the mounting tabs 415 to align with the mounting slots 515. Thus, the indexing tabs 420 may be configured to aid an installer in securing the lighting fixture 500 to the mounting plate 401. In example embodiments, the indexing tabs 420 are not configured for suspending the lighting fixture 500 from the mounting plate 401. For example, none of the weight of the lighting fixture 500 may rest on or be supported by the indexing tab 420. In an example embodiment, a mounting frame 100 and lighting fixture 200 may be modified to include one or more indexing tabs and one or more indexing slots as described herein to aid the installer(s) in aligning the tabs 115 with the slots 215.

Alternative Hinged Embodiment

FIG. 13 illustrates another example embodiment of a mounting system 400" comprising a mounting plate 401" and a lighting fixture 500". The mounting plate 401" and lighting fixture 500" may be similar to the mounting plate 401 or 401' and lighting fixture 500 or 501' described above, however the mounting plate 401" and lighting fixture 500" are attached to one another by a hinge 425" such that the lighting fixture 500" may be attached to the mounting plate 401" as the mounting plate 401" is being secured to the mounting surface 705 and while the electrical connection is being made between the connecting wires 507 and the junction box wires 715.

In an example embodiment, the hinge 425" comprises one or more hinge mounting tabs 415" and/or one or more hinge indexing tabs 420". For example, the hinge mounting tab 415" and hinge indexing tab 420" may be configured to provide a slideable hinge attachment that secures the lighting fixture 500" to the mounting plate 401" and allows the lighting fixture 500" to translate along a portion of the axis defined by the hinge 425". For example, the lighting fixture 500" may be suspended from the mounting plate 401" by the hinge 425". For example, the hinge mounting tab 415" and the hinge indexing tab 420" be shaped such that the tabs 415" and 420" are held within the corresponding slots 515 and 520 while the lighting fixture 500" is rotated with respect to the mounting plate 401" and about the axis defined by the hinge 425". The hinge mounting tab 415" and the hinge indexing tab 420" may be further shaped such that they may slide along the length of the corresponding slots 515 and 520 such that the lighting fixture 500" may be slide or translated in a direction parallel or anti-parallel to the axis defined by the hinge 525" with respect to the mounting plate 401". When the lighting fixture 500" is translated in a direction parallel or anti-parallel to the axis defined by the hinge 525" with respect to the mounting plate 401" when the mounting tabs 415 are aligned at least partially within the mounting slots 515, the mounting tabs 415 may engage the mounting slots 515 such that the mounting tabs 415 may be secured within the mounting tabs. The relative length of the tabs 415" and 420" compared to the corresponding slots 515 and 520 will define the distance the lighting fixture 500" may be translated along the axis defined by the hinge 525" with respect to the mounting plate 401".

In example embodiments, once the mounting plate 401" is secured to the mounting surface and the electrical connecting between the connecting wires 507 and the junction box wires 715 is secured, the lighting fixture may be rotated about the hinge 425" such that one or more indexing tabs 420 on a side of the mounting plate 401" opposite the hinge 425" may be aligned with the corresponding indexing slots 520 on the lighting fixture 500". The lighting fixture 500" may be further rotated about the hinge 425" such that the mounting tabs 415" on the side of the mounting plate 401" opposite the hinge 425" are inserted into the mounting slots 515 of the lighting fixture 500". In various embodiments, the hinge 425" may be configured to allow a single installer to mount the lighting fixture 500". For example, the hinge 425" may support the weight of the lighting fixture 500" while an electrical connection is made between the connecting wires 507 and the junction box wires 715.

Mounting a Lighting Fixture with a Mounting Plate

FIG. 14 provides a flowchart of various processes and procedures for installing a lighting fixture 500 using the mounting system 400. Starting at step 602, the installer(s) may secure the mounting plate 401 to the mounting surface 705. For example, an installer may secure the mounting plate 401 to the mounting surface 705 with one or more fasteners 430 secured to the surface 705 such that the junction box 710 (e.g., the junction box wires 715) are accessible through the central opening 405. As discussed herein, in certain embodiments, the installer may secure the mounting plate 401 relative to a can light. In such embodiments, the installer may secure the can light adapter portion relative to the mounting plate 401, and may secure the can light adapter portion with the secured mounting plate relative to an existing can light fixture within a support surface. For example, the can light adapter portion may be configured to snap into can light, as discussed in previously mentioned application Ser. No. 14/720,334.

At step 604, the installer(s) may electrically connect the lighting fixture 500 to a power supply. For example, the installer(s) may electrically connect the connecting wires 507 to the junction box wires 715 so as to provide line voltage to the driver circuitry and/or other electrical components of the lighting fixture 500. For example, the installer may electrically connect the connecting wires 507 to the junction box wires 715 with quick connect connectors, wire nuts, and/or the like. In example embodiments, the connecting wires 507 may be configured such that the portion of the connecting wires that makes the electrical connection to the junction box wires 715 may be positioned within the junction box 710 after the electrical connection has been made.

At step 606, the indexing slots 520 are aligned with the indexing tabs 420. For example, the installer(s) may align the indexing slots 520 with the indexing tabs 420. For example, the indexing slots 520 may be engaged by the indexing tabs 420 to place the lighting fixture 500 in appropriate alignment with the mounting plate 401 for securing the lighting fixture 500 to the mounting plate 401.

At step 608, the mounting slots 515 may be aligned with the mounting tabs 415. For example, the installer(s) may check to ensure the mounting slots 515 are aligned with the mounting tabs 415, move the lighting fixture 500 toward the mounting plate 401 such that the mounting tabs 415 are generally inserted into the mounting slots 515, and/or the like. In general, alignment and/or engagement of the indexing slot(s) 520 and the corresponding indexing tab(s) 420 facilitates easy alignment of the mounting slots 515 and the mounting tabs 415.

At step 610, the lighting fixture 500 is slid along the mounting tabs 415 to secure the lighting fixture 500 to the mounting plate 410. For example, the mounting tabs 415 may be inserted into the corresponding mounting slots 515 and the lighting fixture 500 may be slid along the mounting tabs 415 until the locking portions 417 engage the corresponding locking slots 517, thus securing the lighting fixture 500 to the mounting plate 401 and the mounting surface 705.

Additional Pivotable Embodiment

FIG. 15 illustrates yet another example embodiment of a mounting system 1400 comprising a mounting portion (e.g., mounting plate 1401) and a lighting fixture 1500. The mounting plate 1401 and lighting fixture 1500 may be similar to the mounting plate 401, 401', or 401" and lighting fixture 500, 501', or 501" described above, however the mounting plate 1401 and lighting fixture 1500 are moveably secured (e.g., slidably secured, pivotably secured, and/or the like) relative to one another by a mounting arm 1426 extending between a mounting point 1425 of the mounting plate 1401 and a light fixture pivot point 1427. In various embodiments, the mounting arm 1426 may be pivotably secured relative to the light fixture pivot point 1427 at an arm pivot point defined proximate an end of the mounting arm 1426. In the illustrated embodiment of FIG. 15, the mounting point 1425 is defined within a guide rail 1420 defined along an edge of the mounting plate 1401. As will be discussed in greater detail herein, the guide rail may facilitate movement of the lighting fixture 1500 from a disengaged configuration as shown in FIG. 15 to an engaged configuration in which the light fixture 1500 is supported at least substantially parallel to and adjacent a support surface onto which the mounting plate 1401 is secured. Moreover, as shown in FIG. 15, the light fixture pivot point 1427 may be defined within a back portion 1510 of lighting fixture 1500. For example, the light fixture pivot point 1427 may be defined within a fixture frame 1520 extending at least partially around the perimeter of the back portion 1510 of the lighting fixture 1500. As will be discussed in greater detail herein, at least a portion of the fixture frame 1520 may be at least substantially parallel and adjacent the guide rail 1420 when the lighting fixture 1500 is in the engaged configuration relative to the mounting plate 1401.

In various embodiments, the mounting arm 1426 may be configured to pivot about the mounting point 1425 and/or the light fixture pivot point 1427 such that the light fixture 1500 may be pivotably moveable relative to the mounting plate 1401. For example, the mounting arm 1426 may be configured to pivot about a first axis extending through the mounting point 1425 and/or a second axis extending through the light fixture pivot point 1427. Accordingly, the lighting fixture 1500 may be pivotable about at least one (e.g., two) axis relative to the mounting plate 1401. In various embodiments, the first axis and the second axis may be at least substantially parallel, and may be oriented at least substantially perpendicular to a length of the one or more guide rails 1420.

Moreover, in various embodiments, the mounting arm 1426 may be detachably secured at the mounting point 1425 and/or the light fixture pivot point 1427 (e.g., via one or more fasteners, such as screws, bolts, rivets, and/or the like) such that the light fixture 1501 may be detachably secured relative to the mounting plate 1401. Accordingly, the mounting plate 1401 may be secured relative to a support surface (e.g., a horizontal support surface such as a ceiling, a vertical support surface such as a wall, and/or an angled support surface), a junction box, a can light assembly, and/or the like before the lighting fixture 1500 is secured relative to the mounting plate 1401.

In various embodiments, the mounting system 1400 may define a slide mechanism such that the lighting fixture 1501 may be slidably secured relative to the mounting plate 1401. As will be discussed herein, the slide mechanism may enable the lighting fixture 1501 to slide relative to the mounting plate 1401 such that one or more mounting features engages and/or disengages between the lighting fixture 1501 and the mounting plate 1401 when moving the lighting fixture 1500 to and/or from the engaged configuration. For example, as shown in Figure the mounting arm 1426 may define a slide slot 1428 configured to enable the mounting arm 1426 and the lighting fixture 1500 to slide relative to the mounting point 1425 and the mounting plate 1401. However, it should be understood that the guide rail 1420 and/or the fixture frame 1520 may, in certain embodiments, define the slide slot 1428 to enable the lighting fixture 1500 to slide relative to the mounting plate 1401.

In various embodiments, the slide mechanism may be configured such that the lighting fixture 1501 may slide in a direction perpendicular to the one or more pivot axes discussed herein (e.g., axis extending through the one or more mounting points 1425 and/or axis extending through the one or more light fixture pivot points 1427). In various embodiments, the slide mechanism may be configured such that the lighting fixture 1500 slides relative to the one or more mounting points 1425 and/or the one or more light fixture pivot points 1427, and accordingly the lighting fixture 1500 slides relative to the one or more pivot axes. For example, the lighting fixture 1500 (and mounting arm 1426) may be configured to slide from a first position in which the mounting points 1425 are at a first side of a slide slot 1428 (and accordingly the pivot axis extending through the mounting points 1425 is located at the first side of the slide slot 1428) to a second position in which the mounting points 1425 are at a second side of the slide slot 1428, opposite the first side (and accordingly the pivot axis extending through the mounting points 1425 are located at the second side of the slide slot 1428).

In various embodiments, such as that illustrated in FIG. 15, the mounting system 1400 may comprise a mounting arm 1426 and/or a mounting harness 1150 similar to mounting harness 150 described herein. Collectively, the mounting arm 1426 and the mounting harness 1150 may be configured to suspend the lighting fixture 1500 a distance away from the mounting plate 1401 to facilitate establishing an electrical connection between lighting fixture connecting wires 1507 and wires of a junction box or other power source (not shown) extending through a central opening 1405 of the mounting plate 1401.

Moreover, as shown in FIG. 15, the mounting plate 1401 may comprise one or more mounting catches 1430 configured to engage one or more corresponding fixture catches 1530 of the lighting fixture 1500. In various embodiments, the mounting catches 1430 may comprise one or more support plates configured to engage and/or support the fixture catches 1530. The support plates may each be fixed relative to the mounting plate 1401 via one or more standoff portions configured to support the support plate at a distance away from a surface of mounting plate 1401. In various embodiments, the support plate and standoff portion may form a substantially "L" shape secured relative to the mounting plate 1401 at the top portion of the "L." Accordingly, the standoff portions may be secured proximate an end of the support plate.

In various embodiments, the mounting catches 1430 may be embodied as a continuous portion of the mounting plate 1401 (e.g., a portion of sheet metal defining the mounting plate 1401), such that a portion of the mounting plate 1401 is bent to form the standoff portion and the support plate. However, it should be understood that the standoff portion and/or the support plate may be a separate portion secured relative to the mounting plate 1401. In the illustrated embodiment of FIG. 15, the standoff portion may be oriented at least substantially perpendicular to the mounting plate 1401. The support plate may be oriented at a right or acute angle relative to the standoff portion, such that the fixture catch 15 is securely supported by the support plate. For example, in the illustrated embodiment of FIG. 15, the support plate is oriented at an acute angle relative to the standoff portion, such that the fixture catch 1530 is biased toward the standoff portion when supported by the mounting catch 1430.

In various embodiments, the mounting catch 1430 may be flexible and/or elastic and configured to bias a lighting fixture 1500 toward a support surface against which the mounting plate 1401 is secured. For example, as a fixture catch 1530 is being inserted into the mounting catch 1430, the mounting catch 1430 may be configured to flex away from mounting plate 1401 to accommodate the movement of the fixture catch 1530 onto the support plate (e.g., between the support plate and the mounting plate 1401). The mounting catch 1430 may be configured to apply a return force attempting to return the mounting catch 1430 toward its unflexed orientation, thereby biasing the fixture catch 1530, and therefore the lighting fixture 1500, toward the mounting plate 1401 and/or the support surface.

Moreover, as shown in FIG. 15, the support plate may define an entry edge opposite the standoff. The entry edge may be configured to facilitate movement of a portion of the fixture catch 1530 onto the support plate of the mounting catch 1430. For example, the entry edge may be angled relative to the remainder of the support plate to guide the portion of the fixture catch 1530 onto the support plate of the mounting catch 1430. For example, in the illustrated embodiment of FIG. 15, the entry edge may be angled away from the mounting plate 1401 such that the fixture catch 1530 may be guided toward the mounting plate 1401 and onto the support plate of the mounting catch 1430 when the lighting fixture 1500 is moved toward the engaged configuration.

In various embodiments, the mounting catch 1430 may comprise one or more locking features configured to maintain the fixture catch 1530 within the mounting catch 1430 when inserted therein. The locking features may be embodied as one or more stoppers (e.g., bumps, protrusions, and/or the like) disposed on a surface of the support plate, one or more clips, and/or the like). For example, the illustrated embodiment of FIG. 15 incorporates one or more bumps extending from a surface of the support plate. The bumps extending from a surface of the support plate impede the fixture catch 1530 from sliding off of the mounting catch 1430. Moreover, in embodiments in which the mounting catch 1430 biases the fixture catch 1530 toward the mounting plate 1401, the locking features (e.g., bumps) may further impede movement of the fixture catch 1530 out of the mounting catch 1430 by increasing the required force necessary to overcome the biasing force of the mounting catch 1430.

As illustrated in FIG. 15, the fixture catch 1530 may comprise an at least substantially "U"-shaped plate secured relative to the back portion 1510 of the lighting fixture 1500. The fixture catch 1530 may comprise a catch plate supported between two eye-standoffs configured to position the catch plate at a distance away from the back portion 1510 of the lighting fixture 1500. In various embodiments, the fixture catch 1530 may be secured relative to the back portion 1510 via one or more fasteners (e.g., screws, bolts, adhesives, and/or the like).

In various embodiments, at least a portion of the fixture catch 1530 is configured to fit around the support plate of the mounting catch 1430 such that the fixture catch 1530 is supported by the mounting catch 1430. Moreover, in various embodiments, a leading edge of the catch plate (e.g., the edge of the catch plate oriented to engage the mounting catch 1430 first) may be angled away from the back portion 1510. Accordingly, the leading edge of the catch plate may be configured to facilitate movement of the catch plate onto the support plate to engage the fixture catch 1530 with the mounting catch 1430. Moreover, in various embodiments, the trailing edge of the catch plate (e.g., the edge opposite the leading edge) may be angled toward the back portion 1510. Accordingly, the trailing edge of the catch plate may be configured to impede unintentional movement of the catch plate off of the support plate. For example, when the fixture catch 1530 is engaged with the mounting catch 1430, the trailing edge of the catch plate may be configured to engage one or more locking features of the mounting catch 1430 to impede unintentional movement of the lighting fixture 1500 relative to the mounting plate 1401.

In various embodiments, the fixture catch 1530 may have any of a variety of shapes. For example, the fixture catch 1530 may have an "L" shape corresponding to the shape of the mounting catch 1430 such that the fixture catch 1530 and the mounting catch 1430 interlock. In yet another embodiment, the fixture catch 1530 may have an "L" shape and the mounting catch 1430 may have an at least substantially "U" shape configured to engage the "L" shaped fixture catch 1530. It should be understood that any of a variety of fixture catch 1530 and mounting catch 1430 configurations may be utilized in which the fixture catch 1530 is configured to engage the mounting catch 1430 to secure the lighting fixture 1500 in a secured configuration.

Various embodiments of the lighting fixture 1500 may be installed in a manner similar to that described herein. In various embodiments, installation of the lighting fixture 1500 may begin by securing the mounting plate 1401 relative to a support surface, a Jbox, a canister light (e.g., utilizing a can light retrofit bracket such as that described in U.S. patent application Ser. No. 14/720,334, filed May 22, 2015, which is incorporated herein by reference in its entirety). For example, the mounting plate 1401 may be secured to the support surface via one or more fasteners (e.g., screws, bolts, nails, wall anchors, adhesive, and/or the like). In specific example embodiments, the mounting plate 1401 may be secured directly to the support surface via the one or more fasteners such that the mounting plate 1401 is secured and remains parallel and adjacent to the support surface.

In embodiments in which the lighting fixture 1500 is not previously secured relative to the mounting plate 1401 (e.g., via mounting harness 1150 and/or mounting arm 1426), the lighting fixture 1500 is secured relative to the mounting plate 1401. An electrical connection is then established between connecting wires 1507 and junction box wires. Thereafter, the lighting fixture 1500 is pivoted about mounting point 1425 and/or lighting fixture pivot point 1427 such that a back portion 1510 is at least substantially parallel with support surface and the one or more fixture catches 1530 are aligned with corresponding mounting catches 1430. With reference to FIG. 15, the lighting fixture 1500 is moved in the direction of the illustrated curved directional arrow from the illustrated position toward the support surface. The lighting fixture 1500 is then slid relative to mounting plate 1401 along a slide mechanism (e.g., slide slot 1428 within mounting arm 1426) such that the fixture catches 1530 are moved at least substantially linearly toward corresponding mounting catches 1430 until fixture catches 1530 are engaged with corresponding mounting catches 1430. As discussed herein, as the lighting fixture 1500 is slid relative to mounting plate 1401, at least a portion of fixture frame 1520 may slide adjacent guide rail 1420 such that the lighting fixture 1500 is guided along a substantially linear travel path. Moreover, as discussed herein, mounting catches 1430 may be configured to bias engaged fixture catches 1530 toward the support surface, such that the lighting fixture 1500 is positioned adjacent the support surface.

Although light fixture 1500 is discussed herein as being mounted relative to a mounting plate 1401, it should be understood that in various embodiments, the light fixture 1500 may be secured relative to a mounting frame similar to those discussed herein. In such embodiments, the mounting frame may comprise one or more features discussed herein in reference to mounting plate 1401 to enable mounting of the lighting fixture 1500.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mounting arm for securing a mounting portion relative to a lighting fixture, the mounting arm comprising:
    an elongate portion extending in a first plane between a mounting portion and a lighting fixture, the mounting portion being located in a second plane different than the first plane;
    an attachment point located at one end of the elongate portion; and
    a slidable slot located intermediate the one end and a midpoint of the elongate portion and extending in a longitudinal direction of the elongate portion,
    wherein:
        the lighting fixture is independently and slidably movable in a direction perpendicular to the mounting portion when in a disengaged configuration, and
        the lighting fixture is independently and purely pivotably movable relative to the mounting portion outside the disengaged configuration.

2. The mounting arm of claim 1, wherein:
    the lighting fixture is further pivotable about a first axis relative to the mounting portion when in the disengaged configuration that involves the lighting fixture being disengaged from the mounting portion; and
    the lighting fixture is slidable relative to the mounting portion in a direction perpendicular to the first axis.

3. The mounting arm of claim 1, wherein the lighting fixture is slidable relative to the mounting portion in a direction substantially parallel to a mounting surface to which the mounting portion is secured.

4. The mounting arm of claim 1, wherein the mounting portion is pivotably secured at a first end of the at least one mounting arm and the lighting fixture is pivotably secured at a second end of the at least one mounting arm.

5. The mounting arm of claim 4, wherein the mounting portion is further slidably secured at the first end of the mounting arm.

6. The mounting arm of claim 4, wherein the lighting fixture is secured relative to the mounting portion by at least one mounting harness.

7. The mounting arm of claim 1, wherein the lighting fixture is detachably secured relative to the mounting portion.

8. The mounting arm of claim 1, wherein the mounting portion is configured to be secured to at least one of the support surface, a junction box secured within the support surface, or a can light secured within the support surface.

9. The mounting arm of claim 1, wherein the mounting portion is configured to bias the lighting fixture toward the support surface when the lighting fixture and the mounting portion are engaged relative to one another.

10. The mounting arm of claim 1, wherein the mounting portion comprises one or more mounting catches that are one or more locking features configured to bias the lighting fixture into engagement with the mounting portion.

11. The mounting arm of claim 1, wherein the mounting portion defines at least one guide rail, and wherein the lighting fixture is slidable along the guide rail relative to the mounting portion.

12. The mounting arm of claim 1, wherein the mounting portion is selected from a mounting plate or a mounting frame.

13. The mounting arm of claim 1, wherein the lighting fixture is generally rectangular.

* * * * *